US007233965B2

(12) United States Patent
Rarick

(10) Patent No.: US 7,233,965 B2
(45) Date of Patent: Jun. 19, 2007

(54) CONTINUOUS RANDOM NUMBER GENERATION METHOD AND APPARATUS

(75) Inventor: Leonard D. Rarick, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 718 days.

(21) Appl. No.: 10/261,308

(22) Filed: Sep. 30, 2002

(65) Prior Publication Data

US 2004/0064491 A1   Apr. 1, 2004

(51) Int. Cl.
*G06F 1/02* (2006.01)
(52) U.S. Cl. ...................................................... 708/250
(58) Field of Classification Search ................ 708/250, 708/252, 253, 256
See application file for complete search history.

(56) References Cited

U.S. PATENT DOCUMENTS 5,117,380 A * 5/1992 Tanagawa .................... 708/251
5,251,165 A * 10/1993 James, III .................... 708/250
5,966,313 A * 10/1999 Sakamoto .................... 708/250
6,714,955 B2 * 3/2004 Le Quere ..................... 708/250
6,829,628 B2   12/2004 Kim
6,871,206 B2 * 3/2005 Henry et al. ................. 708/250
7,007,050 B2   2/2006 Saarinen

OTHER PUBLICATIONS

FIPS Pub 140-1 Federal Information Processing Standards Publication, "Security Requirements for Cryptographic Modules" (Jan. 11, 1994).
"Handbook of Applied Cryptography" CRC Press 1997 pp. 154-157, 160-161, 191-198 and 203-212.
Gutman, "Software Generation of Practically Strong Random Numbers," Proceedings of the 7th USENIX Security Symposium, San Antonio, Texas Jan. 26-29, 1998.

* cited by examiner

*Primary Examiner*—Chuong D. Ngo
(74) *Attorney, Agent, or Firm*—Meyertons Hood Kivlin Kowert & Goetzel, P.C.; Erik A. Heter

(57) ABSTRACT

A method and apparatus for generating continuous random numbers. The method includes generating a value for a continuous random number using a continuous random number function with a plurality of iterations responsive to at least an input signal different from a request for the value and providing the value if the request for the value is received.

55 Claims, 30 Drawing Sheets

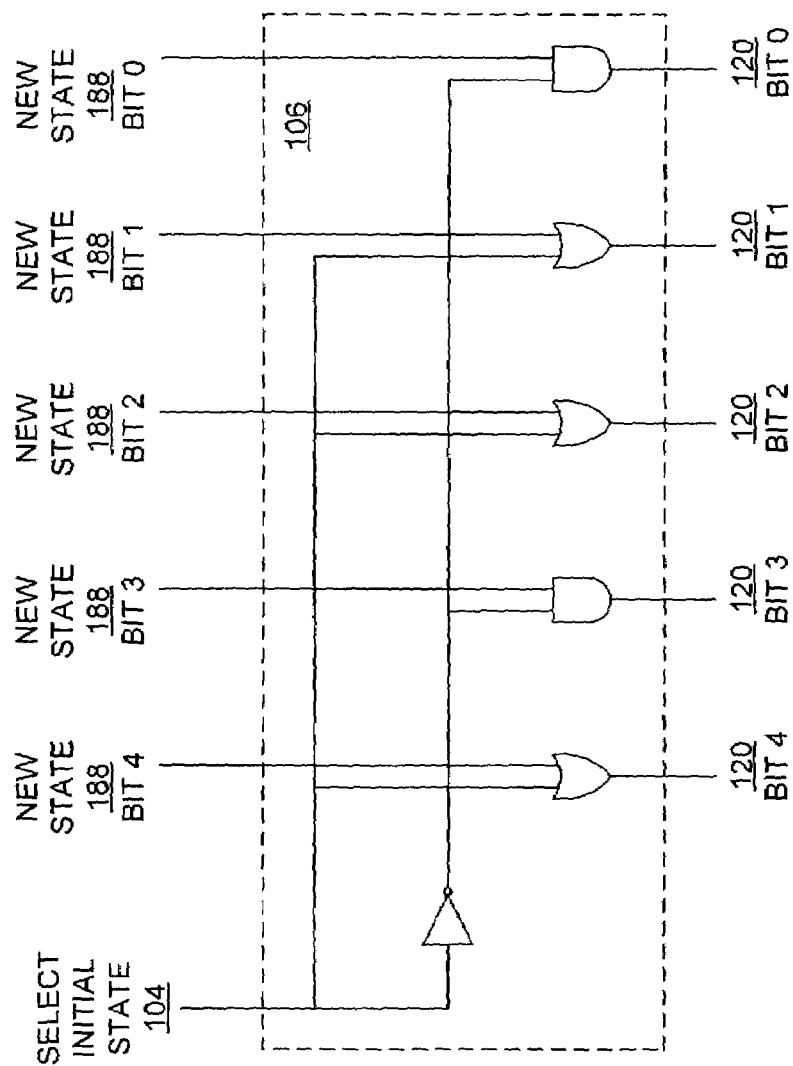
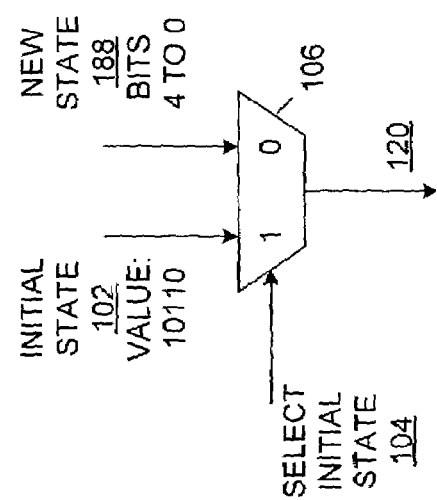
Fig. 1C
Fig. 1B

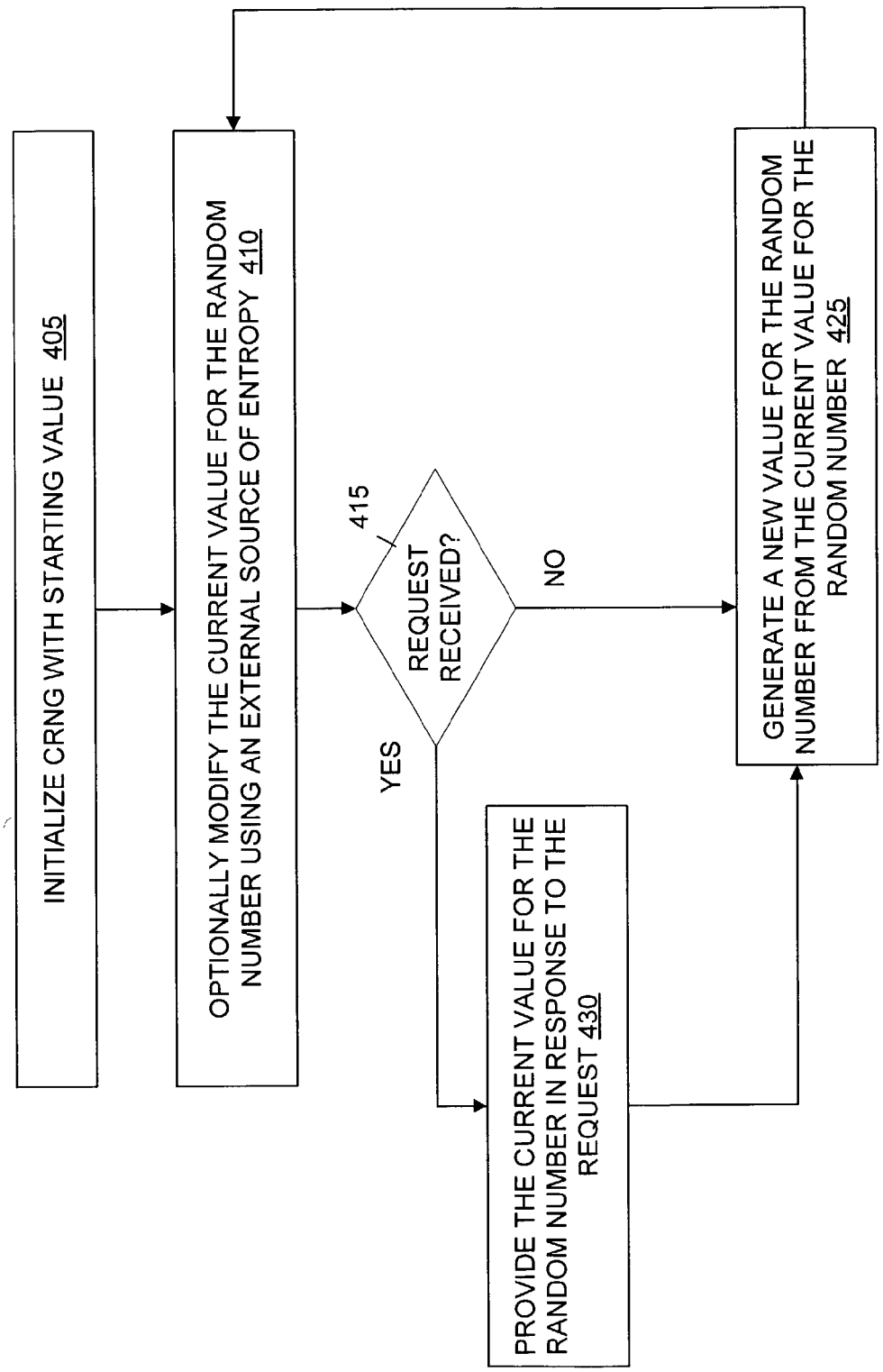

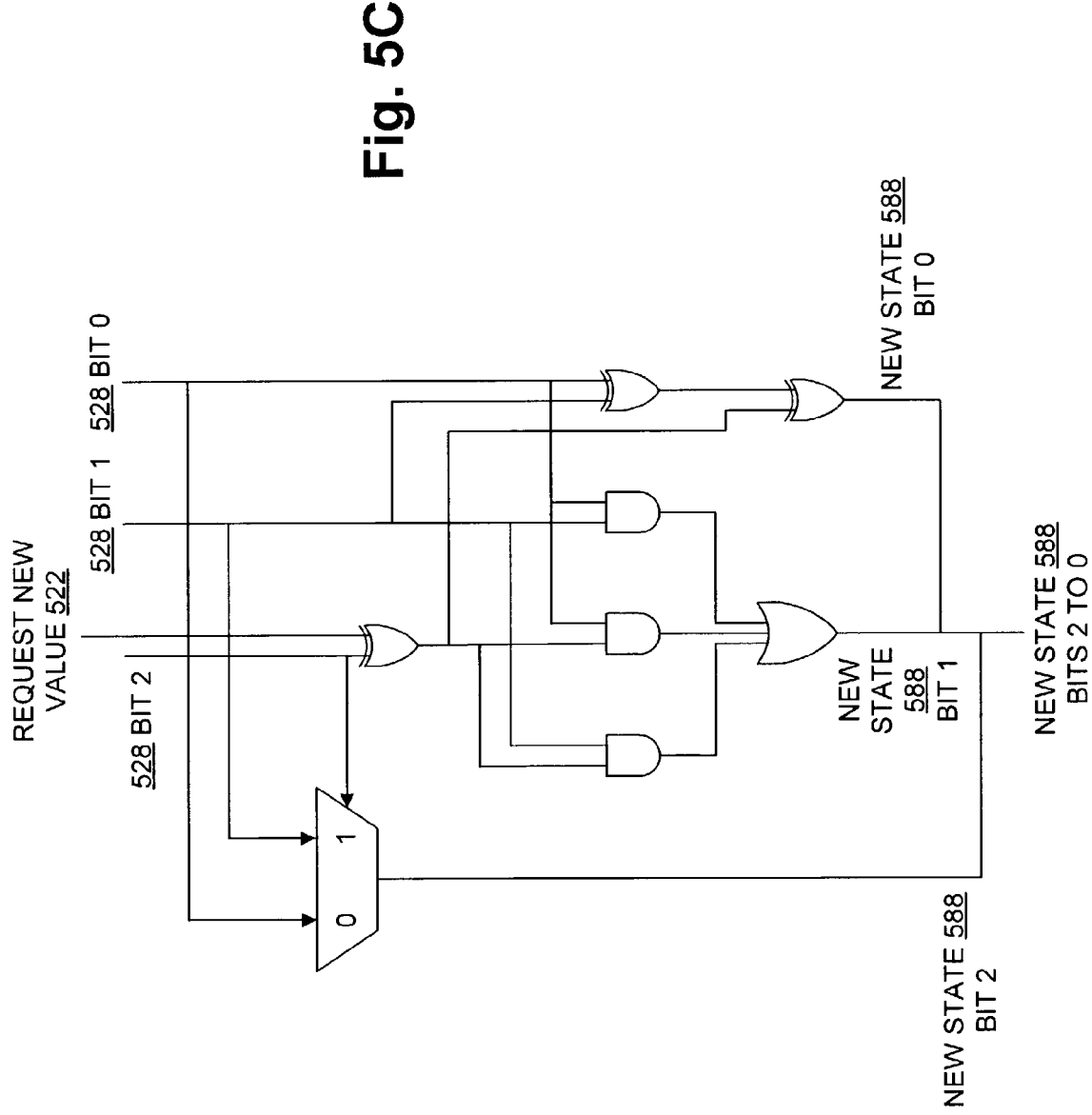

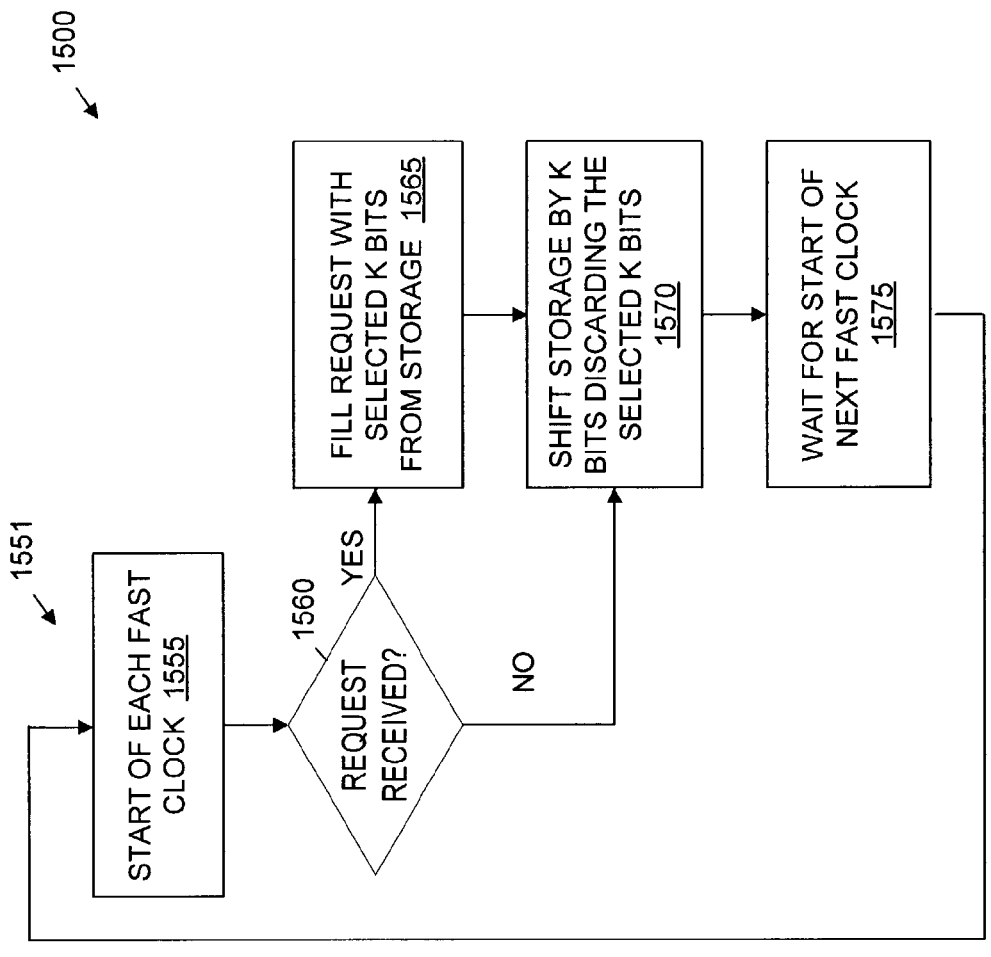
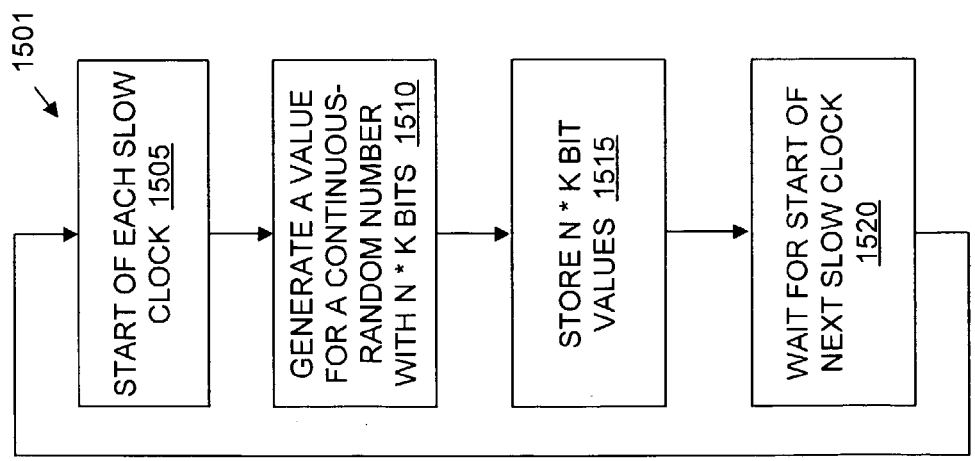
Fig. 15

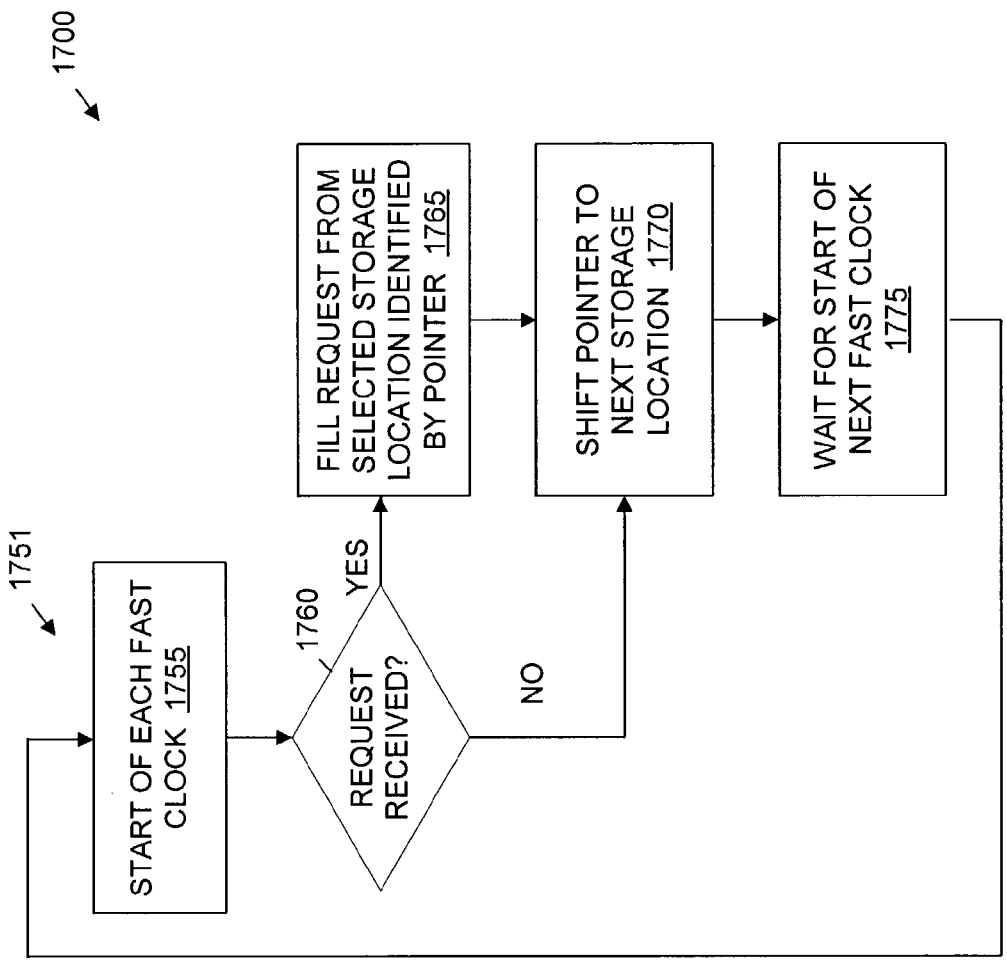
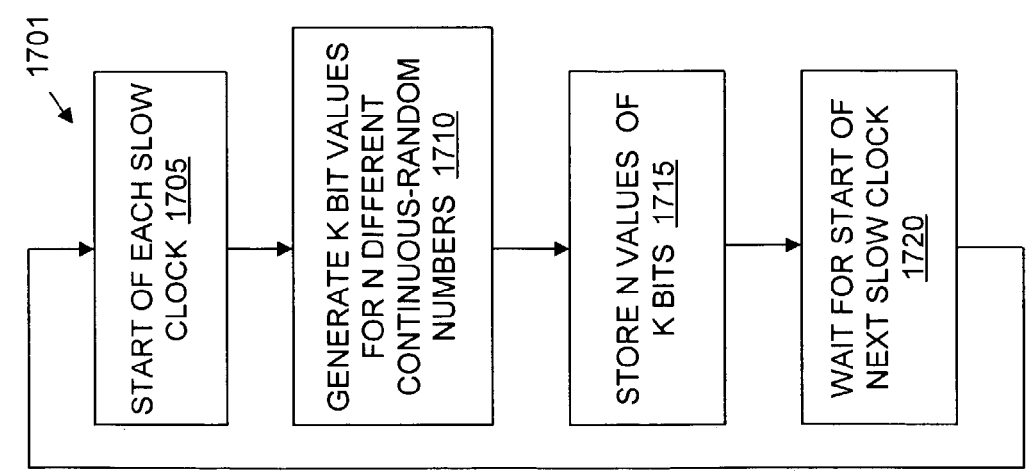
Fig. 17

CONTINUOUS RANDOM NUMBER GENERATION METHOD AND APPARATUS

BACKGROUND OF THE INVENTION

1. Field of the Invention

This invention relates generally to computing systems and electronics, and, more particularly, to a method and apparatus for generating random numbers, such as in a computer system.

2. Description of the Related Art

The use of random numbers, as true random numbers (TRN), as pseudo-random numbers (PRN), and as practically strong random numbers (PSRN) has become very important in modern society. The advent of the inexpensive personal computer, with its astounding computing power for the cost, as well as more powerful server computers has led to an increased interest in computer security, data security, Monte Carlo modeling methods, and tie-breaking protocols, just to name a few of the areas where random numbers are used.

U.S. National Institute of Standards and Technology (NIST) cryptographic standards are specified in Federal Information Processing Standards (FIPS) Publications. Tests for randomness are given in the NIST Special Publication 800–22 (with revisions dated May 15, 2001), titled "*A Statistical Test Suite For Random And Pseudorandom Number Generators For Cryptographic Applications.*" Many software algorithms for producing pseudo-random numbers pass the FIPS tests, but the software algorithms are usually relatively slow. Hardware methods used to produce true random number include measuring the rate of radioactive decay, thermal noise, or background noise, just to name a few. These hardware methods, however, employ processes that are usually difficult to reliably implement. PRN values are obtained by looking for available entropy within the computer. Sources of entropy may include the system clock, the timing of key strokes, number of cache misses, statistics concerning interrupts, content of I/O buffers, and other system variables. This raw information is combined with a hash function to produce random numbers. This procedure is slow and cannot guarantee cryptographically strong results.

SUMMARY OF THE INVENTION

In one aspect of the present invention, a method that provides values for continuous random numbers is provided. The method includes receiving at least an input signal different from a request for a value. The method also includes generating a value for a continuous random number using a continuous random number function with a plurality of iterations responsive to at least the input signal different from a request for the value. The method also includes providing the value if the request for the value is received.

In another aspect of the present invention, an apparatus that generates values for continuous random numbers is provided. The apparatus includes a continuous random number function configured to receive a first value and to generate a value for a continuous random number. The apparatus also includes a storage location configured to store the value for the continuous random number in response to at least an input signal different from a request for the value. The apparatus also includes an output gate coupled to receive the request for the value and to provide the value as an output signal in response to receiving the request.

In still another aspect of the present invention, a method that provides values for continuous random numbers is provided. The method includes generating a value for a continuous random number and generating a new value for the continuous random number independent of a request for the value of the continuous random number. The method also includes providing the new value for the continuous random number in response to the request for the value of the continuous random number.

In yet another aspect of the present invention, an apparatus that generates values for continuous random numbers is provided. The apparatus includes a continuous random number function responsive to at least an input signal different from a request for the value for at least a plurality of iterations. The apparatus also includes a register configured to store a value for a continuous random number from the continuous random number function in response to a first clock signal as values are output by the continuous random number function and storage configured to store a plurality of values output from the register. The apparatus also includes logic coupled to control the storage and an output gate coupled to receive a request for the continuous random number and to provide one of the plurality of values in the storage as an output signal in response to receiving the request for the continuous random number. The logic is configured to fill the storage with the plurality of values output from the register and to overwrite a value in the storage when the storage is full.

In still another aspect of the present invention, a method that provides values for continuous random numbers is provided. The method includes generating a series of values for the continuous random numbers responsive to at least an input signal different from a request for the value for at least a plurality of iterations and storing each value of the series of values until storage is full. The method provides a first selected value from storage in response to the request. The method also includes overwriting a second selected value in storage with the current value if the storage is full.

In still yet another aspect of the present invention, an integrated circuit is provided. The integrated circuit includes a continuous random number function configured to provide a value for a continuous random number and logic coupled to receive the value for the continuous random number.

In still yet another aspect of the present invention, an apparatus is provided. The apparatus includes a continuous random number function configured to provide a value for a continuous random number and logic coupled to receive the value for the continuous random number.

In another aspect of the present invention, a system is provided. The system includes two or more substantially identical processors. Each processor includes an execution unit and a continuous random number function configured to provide values for continuous random numbers to the execution unit. Each of the two or more substantially identical processors is coupled to operate in substantially identical operating environments.

In still another aspect of the present invention, a method for reliable computing is provided. The method includes providing two or more substantially identical processors and providing a substantially identical clock signal and data stream to each of the two or more substantially identical processors. Each processor includes a continuous random number function. The method also includes manipulating the data stream in a first one of the two or more substantially identical processors using one or more values from the continuous random number function and manipulating the data stream in a second one of the two or more substantially identical processors concurrently and substantially identically with manipulating the data stream in the first one.

BRIEF DESCRIPTION OF THE DRAWINGS

The invention may be understood by reference to the following description taken in conjunction with the accompanying drawings, in which like reference numerals identify like elements, and in which:

FIGS. 1B and 1C illustrate an exemplary implementation of a five-bit embodiment of the circuit 106 for choosing between inputs, shown in FIG. 1A;

FIG. 4 shows a flowchart of an embodiment of a method for generating and providing a continuous random number, in accordance with one aspect of the present invention;

FIGS. 5B and 5C illustrate an exemplary implementation of a three-bit embodiment of how the CRN function and the Heisenberg function may be integrated with the circuit 586, shown in FIG. 5A;

FIG. 15 shows flowcharts of an embodiment of a method for generating a many-bit continuous random number on a slow clock and providing a subset of the bits of the many-bit the continuous random number on a fast clock, in accordance with one aspect of the present invention;

FIG. 17 shows flowcharts of an embodiment of a method for generating multiple continuous random numbers on a slow clock and providing the continuous random numbers on a fast clock, in accordance with one aspect of the present invention;

Figure 1A:
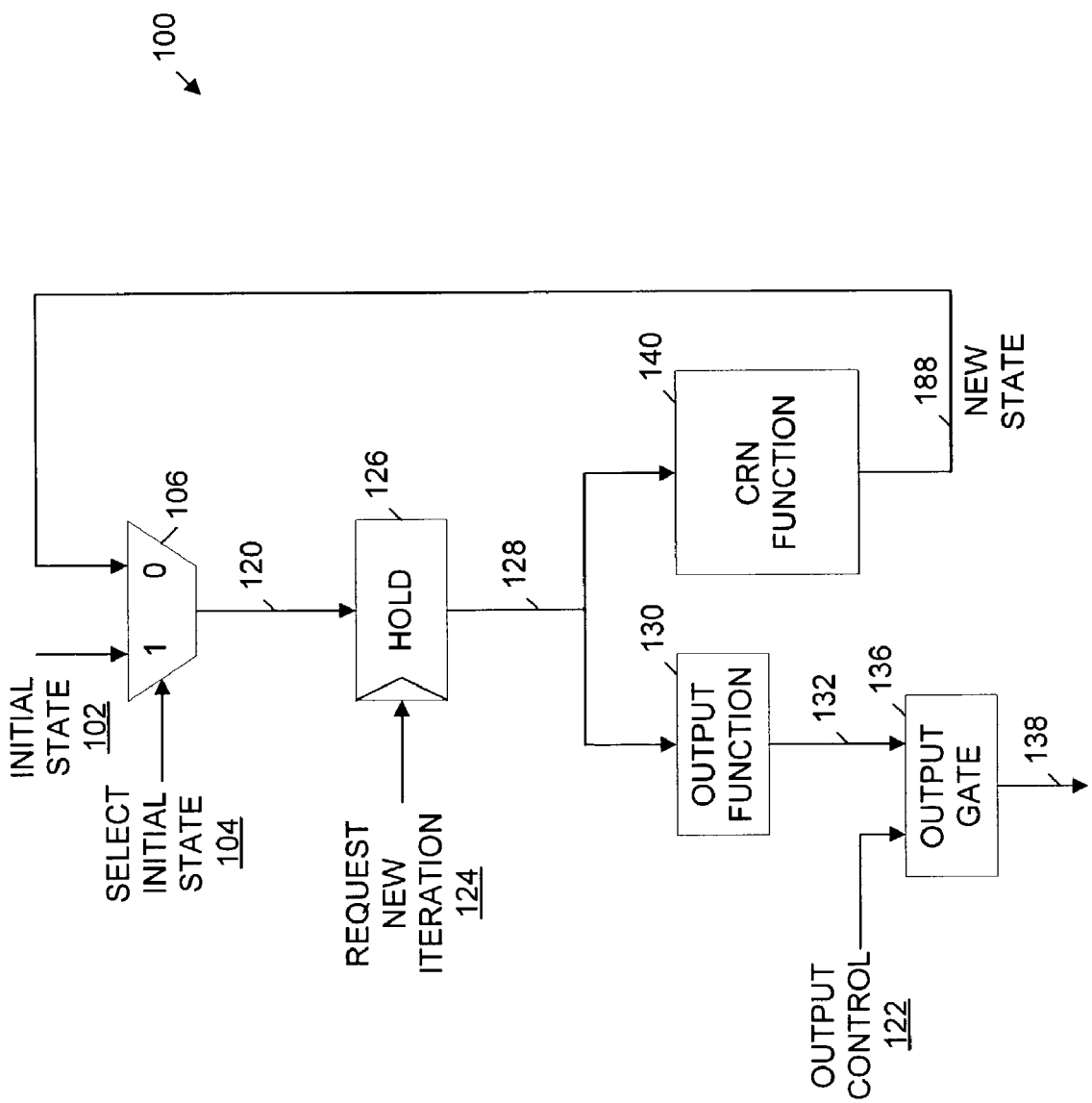
FIG. 1A illustrates a block diagram of a generalized embodiment of a continuous random number generator (CRNG) in accordance with one aspect of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A new method for generating random numbers is introduced, called continuous random number generation (CRNG). A particular kind of CRNG, called a Heisenberg random number generator (HRNG) is also described.

Turning now to the drawings, and specifically referring to FIG. 1A, a block diagram of a generalized embodiment of a continuous random number generator (CRNG) 100, in accordance with one aspect of the present invention, is shown. An initial state value 102 and a new state value 188 are provided to a multiplexer 106. The initial state value 102 may be a fixed value or a varying value for each initialization of the CRNG 100, such as a seed from outside the CRNG 100. The multiplexer 106 is a functional representation. Other methods may be used that functionally accomplish an equivalent result. As used herein, the term "multiplexer," such as multiplexer 106, is used to refer to any of an actual multiplexer known in the art and any circuit that can be devised to select between or among two or more signals for a selected value. Simple OR, AND, NOR, etc. gates may be combined by one of ordinary skill in the art to imitate the functionality of the multiplexer, with or without storage of the initial state and/or the selected value. For example, consider FIG. 1C below.

A chosen state value 120 is selected between the initial state value 102 and the new state value 188 using a select initial state value 104 to the multiplexer 106. The chosen state value 120 is provided to a register 126, which latches upon a request for a new iteration 124. As used herein, the term, "register," such as register 126 is used to refer to any storage device or location that is capable of storing a value, including flip-flops, memory cells, etc. The register 126, etc. shown in the figures are illustrated as flip-flops. A value 128 is provided from the register 126 to an optional output function 130 and to a continuous random number (CRN) function 140. The CRN function 140 generates a new state (or a new value) 188. The new state 188 is provided to the multiplexer 106. The optional output function 130 may transform the value 128 into a transformed value 132. The transformed value 132 is provided to an optional output gate 136. If the optional output function 130 is not present, then the value 128 passes unchanged to the transformed value 132. Upon an assertion of an output control signal 122, the transformed value 132 is provided by the output gate 136 as an output value 138. If the optional output gate 136 is not present, then the transformed value 132 is always present as output value 138, even when not requested.

If the request for the new iteration 124 were the same signal as the request for a new value 122, then FIG. 1A would illustrate a pseudo-random number generator. Hence, the request for the new iteration 124 is not the request for a new value for a continuous random number 122, 322, etc. As shown below, the request for the new iteration 124 may include a clock signal 324, or any other signal or signals that repeat with sufficient frequency. To provide sufficient frequency, the request for a new value for a continuous random number 122, 322, etc. could be ORed with other signals to create an embodiment of the request for the new iteration 124.

The primary value of a continuous random number generator (CRNG) is that continuous random number values are created more frequently than need (or requested). Thus, even if the output gate 136 is absent, most of the values are ignored outside of the CRNG. Further, each request for a continuous random number value comes at a "random" time. The requests may occur when a program is executed that requests the values and the program may or may not be executed at any given time. A request may also occur when a network (e.g., an Internet) session is established. The requests may happen at any time. Accordingly, the entropy of the requests for continuous random number values becomes an element in determining which continuous random number value is provided.

The CRNG 100 stands in contrast with a pseudo-random number generator, where pseudo-random number values are computed when needed and are deterministic. For example, if one random number value were needed for each network connection (as, say, for a short term bulk encryption key) and a network server needed to make, on average, a thousand connections per second, then, on average, one thousand requests per second are needed. If the request for a new iteration 124 is the system clock for a 100 MHz computer, then each second, a hundred million continuous random number values are produced. Thus, on average, only one value out of each hundred thousand values is used. The other 99,999 values may be ignored outside the CRNG 100. If the optional output gate 136 is used, then the other 99,999 values are not even available outside the CRNG 100. It should be noted that the 99,999 discarded values between requests is just an average number. If the request for random values occurs at random then the distribution of request is a Poisson distribution. In this case, the distribution of inter-arrival times (the number of clocks from one request to the next request) is a negative exponential distribution. This yields many different inter-arrival times.

As an example, Table 1 show the results of a simulation of the number of discarded values (inter-arrival time minus one) for the probability of an arrival of 1% per clock. Thus we would expect an average of 99 discarded values per request. In this simulation, the average was 99.2829 values discarded between requests. However, the table shows extensive variation. For example, out of the 10,000 arrivals simulated, 88 times there were no values discarded between one request and the next, 92 times there were exactly one value discarded between one request and the next, 86 times there was exactly two values discarded between one request and the next, and so on. This great variability in inter-arrival times injects considerable entropy into the output of CRNG 100.

TABLE 1

Simulation of the Number of Discarded Values Between Requests

| dis. | # |
| --- | --- |
| 0 | 88 |
| 1 | 92 |
| 2 | 86 |
| 3 | 98 |
| 4 | 89 |
| 5 | 92 |
| 6 | 109 |
| 7 | 70 |
| 8 | 90 |
| 9 | 91 |
| 10 | 80 |
| 11 | 98 |
| 12 | 74 |
| 13 | 110 |
| 14 | 93 |
| 15 | 84 |
| 16 | 79 |
| 17 | 78 |
| 18 | 89 |
| 19 | 79 |
| 20 | 75 |
| 21 | 66 |
| 22 | 81 |

TABLE 1-continued

Simulation of the Number of Discarded Values Between Requests

| dis. | # |
|---|---|
| 23 | 76 |
| 24 | 69 |
| 25 | 79 |
| 26 | 70 |
| 27 | 78 |
| 28 | 79 |
| 29 | 73 |
| 30 | 69 |
| 31 | 78 |
| 32 | 79 |
| 33 | 68 |
| 34 | 65 |
| 35 | 69 |
| 36 | 72 |
| 37 | 71 |
| 38 | 63 |
| 39 | 58 |
| 40 | 67 |
| 41 | 76 |
| 42 | 78 |
| 43 | 70 |
| 44 | 58 |
| 45 | 79 |
| 46 | 70 |
| 47 | 69 |
| 48 | 50 |
| 49 | 49 |
| 50 | 65 |
| 51 | 65 |
| 52 | 62 |
| 53 | 69 |
| 54 | 65 |
| 55 | 61 |
| 56 | 60 |
| 57 | 45 |
| 58 | 61 |
| 59 | 56 |
| 60 | 48 |
| 61 | 54 |
| 62 | 48 |
| 63 | 54 |
| 64 | 53 |
| 65 | 61 |
| 66 | 58 |
| 67 | 55 |
| 68 | 51 |
| 69 | 56 |
| 70 | 58 |
| 71 | 52 |
| 72 | 51 |
| 73 | 53 |
| 74 | 45 |
| 75 | 43 |
| 76 | 57 |
| 77 | 51 |
| 78 | 46 |
| 79 | 47 |
| 80 | 42 |
| 81 | 32 |
| 82 | 44 |
| 83 | 40 |
| 84 | 51 |
| 85 | 38 |
| 86 | 41 |
| 87 | 53 |
| 88 | 41 |
| 89 | 38 |
| 90 | 39 |
| 91 | 44 |
| 92 | 33 |
| 93 | 42 |
| 94 | 39 |
| 95 | 40 |
| 96 | 33 |
| 97 | 28 |
| 98 | 34 |
| 99 | 35 |
| 100 | 36 |
| 101 | 40 |
| 102 | 32 |
| 103 | 40 |
| 104 | 38 |
| 105 | 41 |
| 106 | 39 |
| 107 | 35 |
| 108 | 34 |
| 109 | 42 |
| 110 | 29 |
| 111 | 37 |
| 112 | 28 |
| 113 | 28 |
| 114 | 36 |
| 115 | 29 |
| 116 | 25 |
| 117 | 34 |
| 118 | 28 |
| 119 | 31 |
| 120 | 35 |
| 121 | 34 |
| 122 | 28 |
| 123 | 29 |
| 124 | 32 |
| 125 | 27 |
| 126 | 21 |
| 127 | 28 |
| 128 | 31 |
| 129 | 28 |
| 130 | 34 |
| 131 | 23 |
| 132 | 28 |
| 133 | 30 |
| 134 | 26 |
| 135 | 19 |
| 136 | 19 |
| 137 | 30 |
| 138 | 27 |
| 139 | 14 |
| 140 | 33 |
| 141 | 24 |
| 142 | 24 |
| 143 | 30 |
| 144 | 17 |
| 145 | 24 |
| 146 | 21 |
| 147 | 24 |
| 148 | 18 |
| 149 | 19 |
| 150 | 20 |
| 151 | 25 |
| 152 | 19 |
| 153 | 27 |
| 154 | 15 |
| 155 | 19 |
| 156 | 18 |
| 157 | 19 |
| 158 | 30 |
| 159 | 23 |
| 160 | 21 |
| 161 | 12 |
| 162 | 21 |
| 163 | 24 |
| 164 | 20 |
| 165 | 18 |
| 166 | 19 |
| 167 | 12 |
| 168 | 19 |
| 169 | 26 |
| 170 | 19 |
| 171 | 18 |
| 172 | 20 |

TABLE 1-continued

Simulation of the Number of Discarded Values Between Requests

| dis. | # |
|---|---|
| 173 | 19 |
| 174 | 17 |
| 175 | 12 |
| 176 | 23 |
| 177 | 14 |
| 178 | 16 |
| 179 | 12 |
| 180 | 22 |
| 181 | 19 |
| 182 | 16 |
| 183 | 15 |
| 184 | 23 |
| 185 | 18 |
| 186 | 15 |
| 187 | 17 |
| 188 | 19 |
| 189 | 11 |
| 190 | 21 |
| 191 | 12 |
| 192 | 10 |
| 193 | 12 |
| 194 | 19 |
| 195 | 11 |
| 196 | 13 |
| 197 | 12 |
| 198 | 13 |
| 199 | 17 |
| 200 | 11 |
| 201 | 12 |
| 202 | 11 |
| 203 | 15 |
| 204 | 10 |
| 205 | 15 |
| 206 | 17 |
| 207 | 11 |
| 208 | 6 |
| 209 | 10 |
| 210 | 12 |
| 211 | 19 |
| 212 | 11 |
| 213 | 7 |
| 214 | 15 |
| 215 | 10 |
| 216 | 8 |
| 217 | 12 |
| 218 | 6 |
| 219 | 8 |
| 220 | 15 |
| 221 | 14 |
| 222 | 11 |
| 223 | 10 |
| 224 | 10 |
| 225 | 9 |
| 226 | 13 |
| 227 | 11 |
| 228 | 8 |
| 229 | 14 |
| 230 | 14 |
| 231 | 7 |
| 232 | 11 |
| 233 | 10 |
| 234 | 13 |
| 235 | 11 |
| 236 | 8 |
| 237 | 10 |
| 238 | 6 |
| 239 | 9 |
| 240 | 6 |
| 241 | 14 |
| 242 | 9 |
| 243 | 10 |
| 244 | 6 |
| 245 | 11 |
| 246 | 7 |
| 247 | 14 |
| 248 | 13 |
| 249 | 10 |
| 250 | 6 |
| 251 | 8 |
| 252 | 11 |
| 253 | 5 |
| 254 | 5 |
| 255 | 9 |
| 256 | 10 |
| 257 | 9 |
| 258 | 16 |
| 259 | 11 |
| 260 | 12 |
| 261 | 10 |
| 262 | 2 |
| 263 | 14 |
| 264 | 7 |
| 265 | 4 |
| 266 | 8 |
| 267 | 5 |
| 268 | 7 |
| 269 | 11 |
| 270 | 8 |
| 271 | 5 |
| 272 | 6 |
| 273 | 6 |
| 274 | 5 |
| 275 | 8 |
| 276 | 10 |
| 277 | 5 |
| 278 | 5 |
| 279 | 4 |
| 280 | 7 |
| 281 | 5 |
| 282 | 6 |
| 283 | 5 |
| 284 | 2 |
| 285 | 3 |
| 286 | 3 |
| 287 | 6 |
| 288 | 5 |
| 289 | 8 |
| 290 | 3 |
| 291 | 2 |
| 292 | 9 |
| 293 | 6 |
| 294 | 4 |
| 295 | 8 |
| 296 | 5 |
| 297 | 5 |
| 298 | 6 |
| 299 | 7 |
| 300 | 5 |
| 301 | 5 |
| 302 | 5 |
| 303 | 7 |
| 304 | 1 |
| 305 | 3 |
| 306 | 2 |
| 307 | 8 |
| 308 | 3 |
| 309 | 5 |
| 310 | 8 |
| 311 | 5 |
| 312 | 2 |
| 313 | 6 |
| 314 | 5 |
| 315 | 2 |
| 316 | 5 |
| 317 | 4 |
| 318 | 6 |
| 319 | 4 |
| 320 | 3 |
| 321 | 6 |
| 322 | 0 |

TABLE 1-continued

Simulation of the Number of Discarded Values Between Requests

| dis. | # |
|---|---|
| 323 | 4 |
| 324 | 4 |
| 325 | 5 |
| 326 | 4 |
| 327 | 6 |
| 328 | 0 |
| 329 | 1 |
| 330 | 3 |
| 331 | 5 |
| 332 | 2 |
| 333 | 4 |
| 334 | 1 |
| 335 | 2 |
| 336 | 3 |
| 337 | 4 |
| 338 | 1 |
| 339 | 2 |
| 340 | 1 |
| 341 | 3 |
| 342 | 1 |
| 343 | 4 |
| 344 | 2 |
| 345 | 5 |
| 346 | 5 |
| 347 | 1 |
| 348 | 2 |
| 349 | 3 |
| 350 | 8 |
| 351 | 1 |
| 352 | 3 |
| 353 | 1 |
| 354 | 2 |
| 355 | 5 |
| 356 | 2 |
| 357 | 1 |
| 358 | 0 |
| 359 | 3 |
| 360 | 3 |
| 361 | 3 |
| 362 | 2 |
| 363 | 1 |
| 364 | 1 |
| 365 | 3 |
| 366 | 1 |
| 367 | 1 |
| 368 | 0 |
| 369 | 2 |
| 370 | 3 |
| 371 | 4 |
| 372 | 2 |
| 373 | 1 |
| 374 | 1 |
| 375 | 3 |
| 376 | 5 |
| 377 | 2 |
| 378 | 1 |
| 379 | 2 |
| 380 | 3 |
| 381 | 0 |
| 382 | 1 |
| 383 | 3 |
| 384 | 3 |
| 385 | 3 |
| 386 | 2 |
| 387 | 3 |
| 388 | 0 |
| 389 | 0 |
| 390 | 0 |
| 391 | 1 |
| 392 | 0 |
| 393 | 0 |
| 394 | 1 |
| 395 | 3 |
| 396 | 2 |
| 397 | 3 |

TABLE 1-continued

Simulation of the Number of Discarded Values Between Requests

| dis. | # |
|---|---|
| 398 | 2 |
| 399 | 2 |
| 400 | 4 |
| 401 | 4 |
| 402 | 1 |
| 403 | 2 |
| 404 | 2 |
| 405 | 2 |
| 406 | 0 |
| 407 | 1 |
| 408 | 0 |
| 409 | 2 |
| 410 | 3 |
| 411 | 2 |
| 412 | 2 |
| 413 | 2 |
| 414 | 1 |
| 415 | 2 |
| 416 | 1 |
| 417 | 1 |
| 418 | 1 |
| 419 | 3 |
| 420 | 3 |
| 421 | 1 |
| 422 | 1 |
| 423 | 1 |
| 424 | 2 |
| 425 | 3 |
| 426 | 0 |
| 427 | 1 |
| 428 | 1 |
| 429 | 1 |
| 430 | 2 |
| 431 | 1 |
| 432 | 0 |
| 433 | 2 |
| 434 | 1 |
| 435 | 1 |
| 436 | 1 |
| 437 | 2 |
| 438 | 0 |
| 439 | 0 |
| 440 | 2 |
| 441 | 0 |
| 442 | 0 |
| 443 | 0 |
| 444 | 2 |
| 445 | 0 |
| 446 | 0 |
| 447 | 0 |
| 448 | 0 |
| 449 | 2 |
| 450 | 1 |
| 451 | 2 |
| 453 | 1 |
| 454 | 1 |
| 455 | 0 |
| 456 | 2 |
| 457 | 1 |
| 458 | 2 |
| 459 | 0 |
| 460 | 0 |
| 461 | 2 |
| 462 | 1 |
| 463 | 0 |
| 464 | 0 |
| 465 | 1 |
| 466 | 0 |
| 467 | 0 |
| 468 | 1 |
| 469 | 1 |
| 470 | 0 |
| 471 | 1 |
| 472 | 0 |
| 473 | 1 |

TABLE 1-continued

Simulation of the Number of Discarded Values Between Requests

| dis. | # |
|---|---|
| 474 | 2 |
| 475 | 2 |
| 476 | 2 |
| 477 | 0 |
| 478 | 0 |
| 479 | 1 |
| 480 | 1 |
| 481 | 3 |
| 482 | 0 |
| 483 | 1 |
| 484 | 0 |
| 485 | 1 |
| 486 | 2 |
| 487 | 2 |
| 488 | 1 |
| 489 | 0 |
| 490 | 1 |
| 491 | 2 |
| 492 | 0 |
| 493 | 1 |
| 494 | 1 |
| 495 | 1 |
| 496 | 0 |
| 497 | 1 |
| 498 | 0 |
| 499 | 1 |
| 500 | 1 |
| 501 | 1 |
| 502 | 1 |
| 503 | 1 |
| 504 | 1 |
| 505 | 1 |
| 506 | 3 |
| 507 | 1 |
| 508 | 2 |
| 509 | 0 |
| 510 | 0 |
| 511 | 0 |
| 512 | 0 |
| 513 | 1 |
| 514 | 0 |
| 515 | 1 |
| 516 | 2 |
| 517 | 0 |
| 518 | 0 |
| 519 | 0 |
| 520 | 1 |
| 521 | 0 |
| 522 | 0 |
| 523 | 1 |
| 524 | 1 |
| 525 | 1 |
| 526 | 0 |
| 527 | 1 |
| 528 | 1 |
| 529 | 0 |
| 530 | 1 |
| 531 | 1 |
| 532 | 2 |
| 533 | 0 |
| 534 | 0 |
| 535 | 1 |
| 536 | 1 |
| 537 | 1 |
| 538 | 0 |
| 539 | 1 |
| 540 | 1 |
| 541 | 1 |
| 542 | 0 |
| 543 | 1 |
| 544 | 0 |
| 545 | 0 |
| 546 | 1 |
| 547 | 1 |
| 548 | 0 |
| 549 | 0 |
| 550 | 1 |
| 551 | 1 |
| 552 | 1 |
| 553 | 1 |
| 554 | 0 |
| 555 | 1 |
| 556 | 0 |
| 557 | 1 |
| 558 | 2 |
| 559 | 0 |
| 560 | 0 |
| 561 | 0 |
| 562 | 0 |
| 563 | 0 |
| 564 | 0 |
| 565 | 0 |
| 566 | 0 |
| 567 | 0 |
| 568 | 1 |
| 569 | 1 |
| 570 | 0 |
| 571 | 0 |
| 572 | 0 |
| 573 | 1 |
| 574 | 0 |
| 575 | 0 |
| 576 | 0 |
| 577 | 0 |
| 578 | 0 |
| 579 | 1 |
| 580 | 0 |
| 581 | 0 |
| 582 | 0 |
| 583 | 0 |
| 584 | 0 |
| 585 | 0 |
| 586 | 0 |
| 587 | 0 |
| 588 | 0 |
| 589 | 0 |
| 590 | 0 |
| 591 | 0 |
| 592 | 0 |
| 593 | 0 |
| 594 | 0 |
| 595 | 0 |
| 596 | 1 |
| 597 | 0 |
| 598 | 1 |
| 599 | 0 |
| 600 | 0 |
| 601 | 0 |
| 602 | 0 |
| 603 | 0 |
| 604 | 0 |
| 605 | 0 |
| 606 | 0 |
| 607 | 0 |
| 608 | 0 |
| 609 | 0 |
| 610 | 0 |
| 611 | 0 |
| 612 | 0 |
| 613 | 0 |
| 614 | 0 |
| 615 | 0 |
| 616 | 0 |
| 617 | 0 |
| 618 | 1 |
| 619 | 1 |
| 620 | 0 |
| 621 | 0 |
| 622 | 0 |
| 623 | 0 |

TABLE 1-continued

Simulation of the Number of Discarded Values Between Requests

| dis. | # |
|---|---|
| 624 | 1 |
| 625 | 0 |
| 626 | 1 |
| 627 | 0 |
| 628 | 0 |
| 629 | 1 |
| 630 | 0 |
| 631 | 0 |
| 632 | 0 |
| 633 | 1 |
| 634 | 1 |
| 635 | 2 |
| 636 | 1 |
| 637 | 0 |
| 638 | 0 |
| 639 | 0 |
| 640 | 0 |
| 641 | 0 |
| 642 | 0 |
| 643 | 0 |
| 644 | 0 |
| 645 | 1 |
| 646 | 0 |
| 647 | 0 |
| 648 | 0 |
| 649 | 0 |
| 650 | 0 |
| 651 | 0 |
| 652 | 0 |
| 653 | 0 |
| 654 | 1 |
| 655 | 0 |
| 656 | 0 |
| 657 | 0 |
| 658 | 0 |
| 659 | 0 |
| 660 | 0 |
| 661 | 1 |
| 662 | 0 |
| 663 | 0 |
| 664 | 0 |
| 665 | 0 |
| 666 | 0 |
| 667 | 0 |
| 668 | 0 |
| 669 | 0 |
| 670 | 0 |
| 671 | 1 |
| 672 | 2 |
| 673 | 0 |
| 674 | 0 |
| 675 | 0 |
| 676 | 0 |
| 677 | 1 |
| 678 | 0 |
| 679 | 0 |
| 680 | 0 |
| 681 | 0 |
| 682 | 0 |
| 683 | 1 |
| 684 | 0 |
| 685 | 0 |
| 686 | 0 |
| 687 | 0 |
| 688 | 0 |
| 689 | 0 |
| 690 | 0 |
| 691 | 0 |
| 692 | 0 |
| 693 | 0 |
| 694 | 0 |
| 695 | 0 |
| 696 | 0 |
| 697 | 0 |
| 698 | 0 |
| 699 | 0 |
| 700 | 1 |
| 701 | 0 |
| 702 | 0 |

Not shown, there were three cases of more than 700 discarded values between consecutive requests. Simulation used probability of .01 for a request to arrive during any clock. Total number of requests is 10,000. Average number of discarded values per request is 99.2829 in this simulation.

The continuous random number function 140, etc. includes the operational flow or algorithm of any function desired, see FIG. 23 below for one example. Indeed, one could use a linear congruential generator or a linear feedback shift register, etc. These methods are not suitable for pseudo-random number generators because they are readily analyzable using algebraic techniques, and thus, their outputs are readily predictable. However, they are usable in the CRNG 100 since any analysis depends on observing consecutive values, and with the CRNG 100, one never knows if two observed values were generated consecutively or were separated by tens, hundreds, or thousands (or more) of other (unused) values.

The new state or new value 188 is the result of an iteration of the CRNG 100 that may be used to generate the next value for the CRNG 100. The output function 130, etc. is optional and embodiments are known in the art. The output control signal 122 may include a request for a value of a continuous random number or a signal derived from the request for the value of the continuous random number.

Turning now to FIGS. 1B and 1C, an exemplary implementation of a five-bit embodiment of the circuit 106 for choosing between inputs, from FIG. 1A, is shown. In this example, a five bit initial state value of '10110' is to be used when the select initial state 104 has the value of '1,' otherwise the new state value 188 is to be used. The same functionality shown in FIG. 1B is achieved in FIG. 1C. In each location where the value of '1' is desired when the select initial state 104 has the value of '0,' an OR gate is placed to OR the bit in that location with the select initial state 104 value. In each location where the value of '0' is desired when the select initial state 104 has the value of '1,' an AND gate is placed to AND the bit in that location with the complement of the select initial state 104 value. In this way, when the select initial state 104 has the value of '0,' the value of the new state 188 is passed through unchanged to the chosen state value 120. However, when the select initial state 104 has the value of '1,' the desired initial state value 102 of '10110' becomes the chosen state value 120. Although there is no actual multiplexer in FIG. 1C, the circuit of FIG. 1C is functionally equivalent to the multiplexer 106 in FIG. 1B and FIG. 1A. Thus, for the purposes of this disclosure, the circuit of FIG. 1C includes the multiplexer 106.

Figure 2:
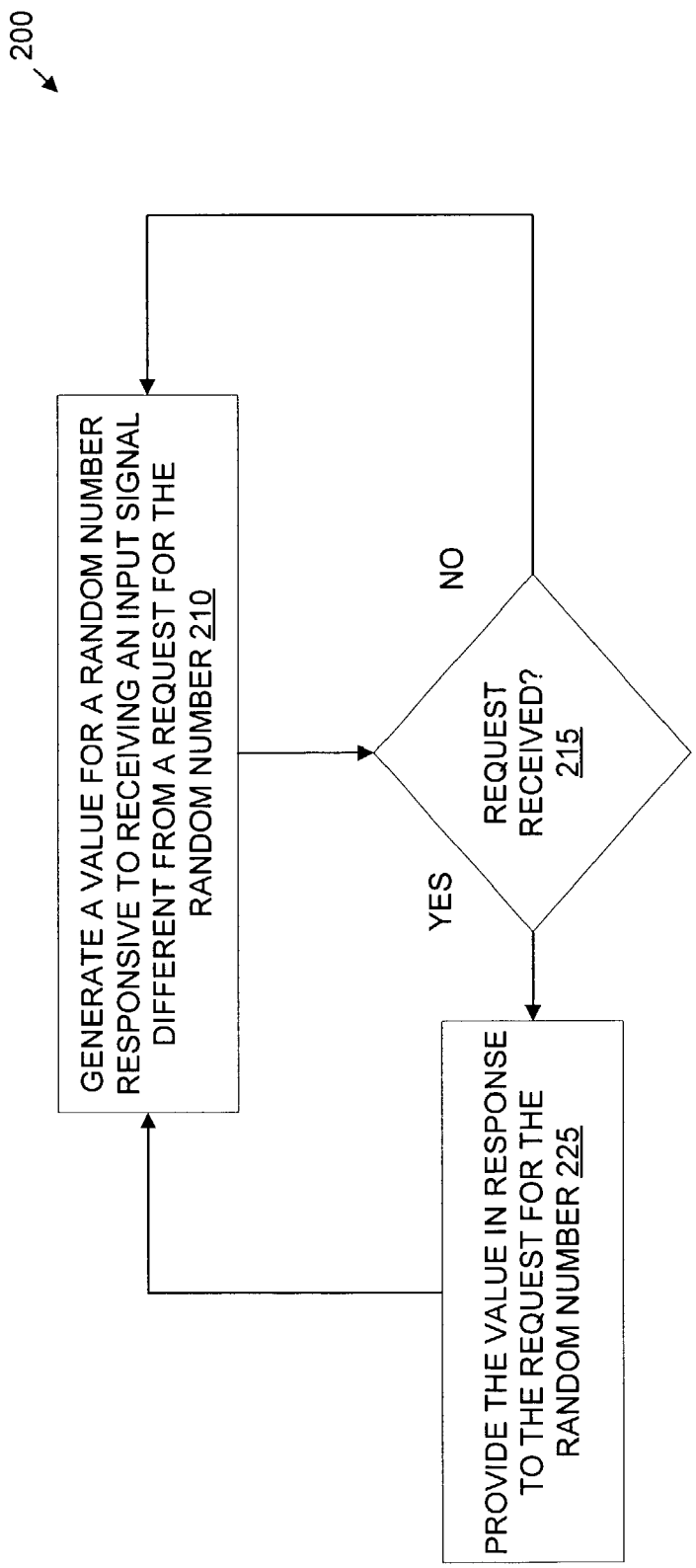
FIG. 2 shows a flowchart of an embodiment of a method for generating and providing values for continuous random numbers, such as when using the CRNG of FIG. 1, in accordance with one aspect of the present invention.

Turning to FIG. 2, a flowchart of a method 200 for generating and providing values for continuous random numbers, such as when using the CRNG 100 of FIG. 1, in accordance with one aspect of the present invention, is shown. The method 200 includes generating a value for a continuous random number responsive to receiving an input signal (e.g., 124 of FIG. 1) different from a request for the value of the continuous random number, in block 210. The method 200 checks, in decision block 215, if the request for the random number has been received: Only if the request has been received in decision block 215, the method 200 provides the value in response to the request for the random number, in block 225, and continues to block 210. If the request for the random number has not been received in decision block 215, then the method continues back to block 210. Generating the value for the continuous random number in block 210 may be performed by any function as desired.

Figure 3A:
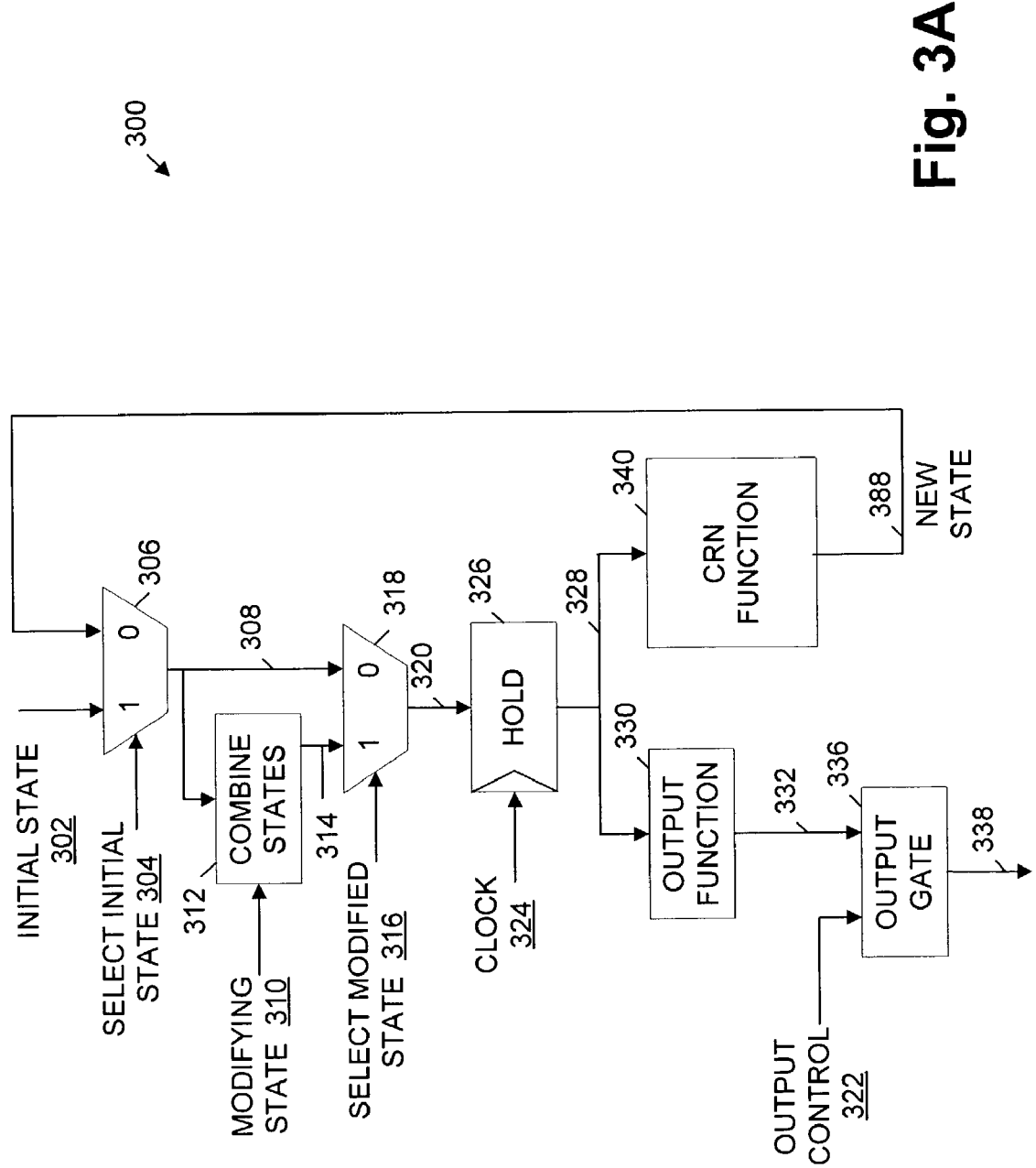
FIG. 3A illustrates a block diagram of an embodiment of a CRNG that accepts modifying state values, in accordance with one aspect of the present invention.

Turning to FIG. 3A, a block diagram of an embodiment of a CRNG 300 that accepts modifying state values, in accordance with one aspect of the present invention, is shown. An initial state value 302 and a new state value 388 are provided to a multiplexer 306. A selected state value 308 is chosen between the initial state value 302 and the new state value 388 using a select initial state value 304 to the multiplexer 306.

The selected state value 308 is provided to a combine state function 312 along with a modifying state value 310. The combine state function 312 produces a combined state value 314. The chosen state value 308 and the combined state value 314 are provided to a multiplexer 318. A chosen state value 320 is chosen between the selected state value 308 and the combined state value 314 using a select modified state value 316 to the multiplexer 318. The combine state function 312 and the multiplexer 318 are functional representations. Other methods may be used that functionally accomplish an equivalent result. For example, consider FIG. 3C below. The chosen state value 320 is provided to a register 326, which latches upon a clock 324.

A value 328 is provided from the register 326 to an optional output function 330 and to a continuous random number function 340. The continuous random number function 340 generates a new state (or a new value) 388. The new state 388 is provided to the multiplexer 306. The optional output function 330 may transform the value 328 into a transformed value 332. The transformed value 332 is provided to an output gate, such as an output gate, 336. Upon an assertion of an output control signal (or a request for a new value) 322, the output gate 336 provides the transformed value 332 as an output value 338.

The combine state function 312 is any function that accepts N bits 308 and M bits 310 and produces N bits 314. The modifying state value 310 is any external input of M bits (could be any available entropy such as used as a source in a PSRN generator). The select modified state value 316 is one bit that indicates if 310 is to be used for a given iteration. An example of signal 124 of FIG. 1A is the clock 324. Recall that the output gate 336 is optional.

Figure 3B:
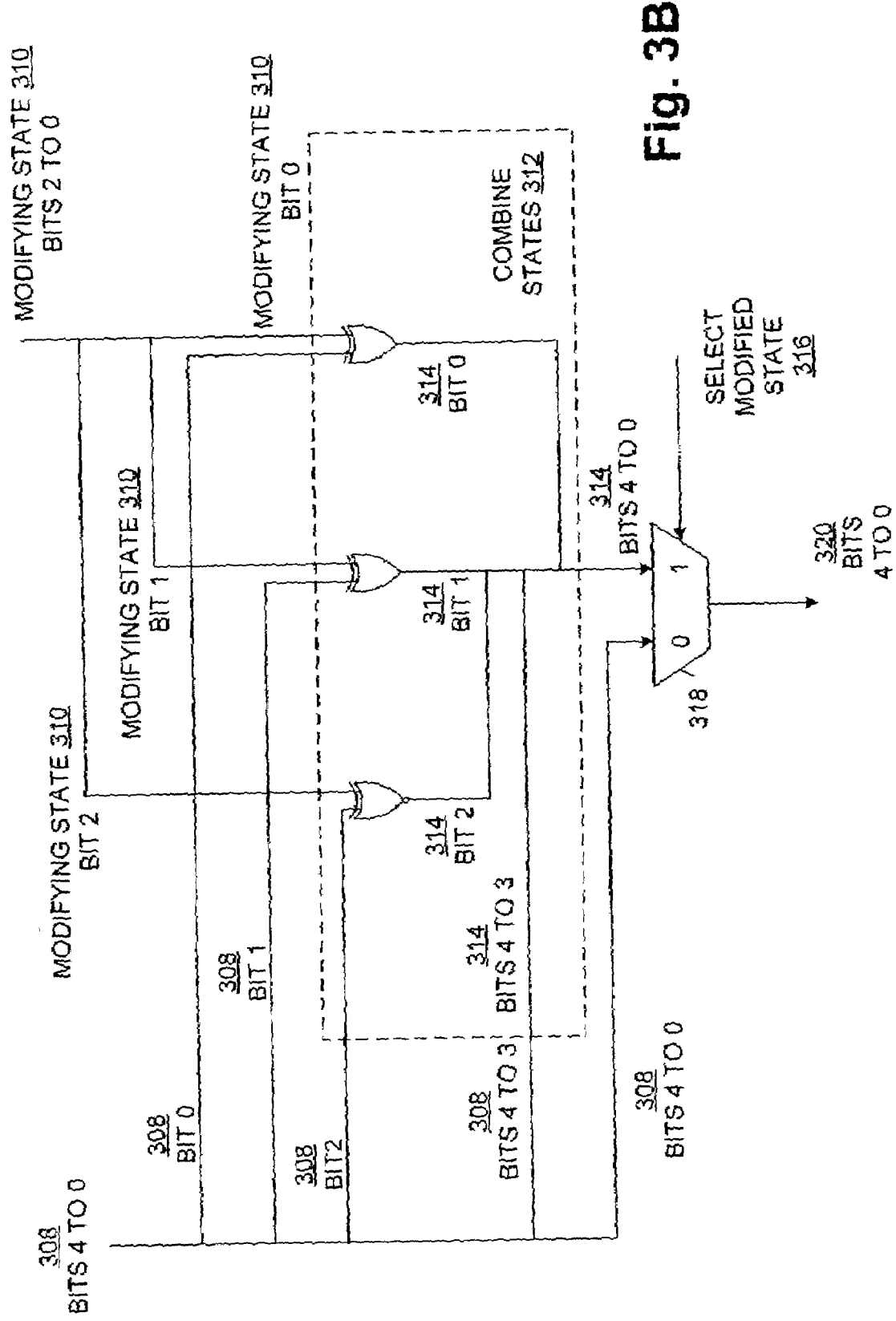
FIGS. 3B and 3C illustrate an exemplary implementation of a five-bit embodiment of the combine state function 312 and the circuit 318, shown in FIG. 3A.
Figure 3C:
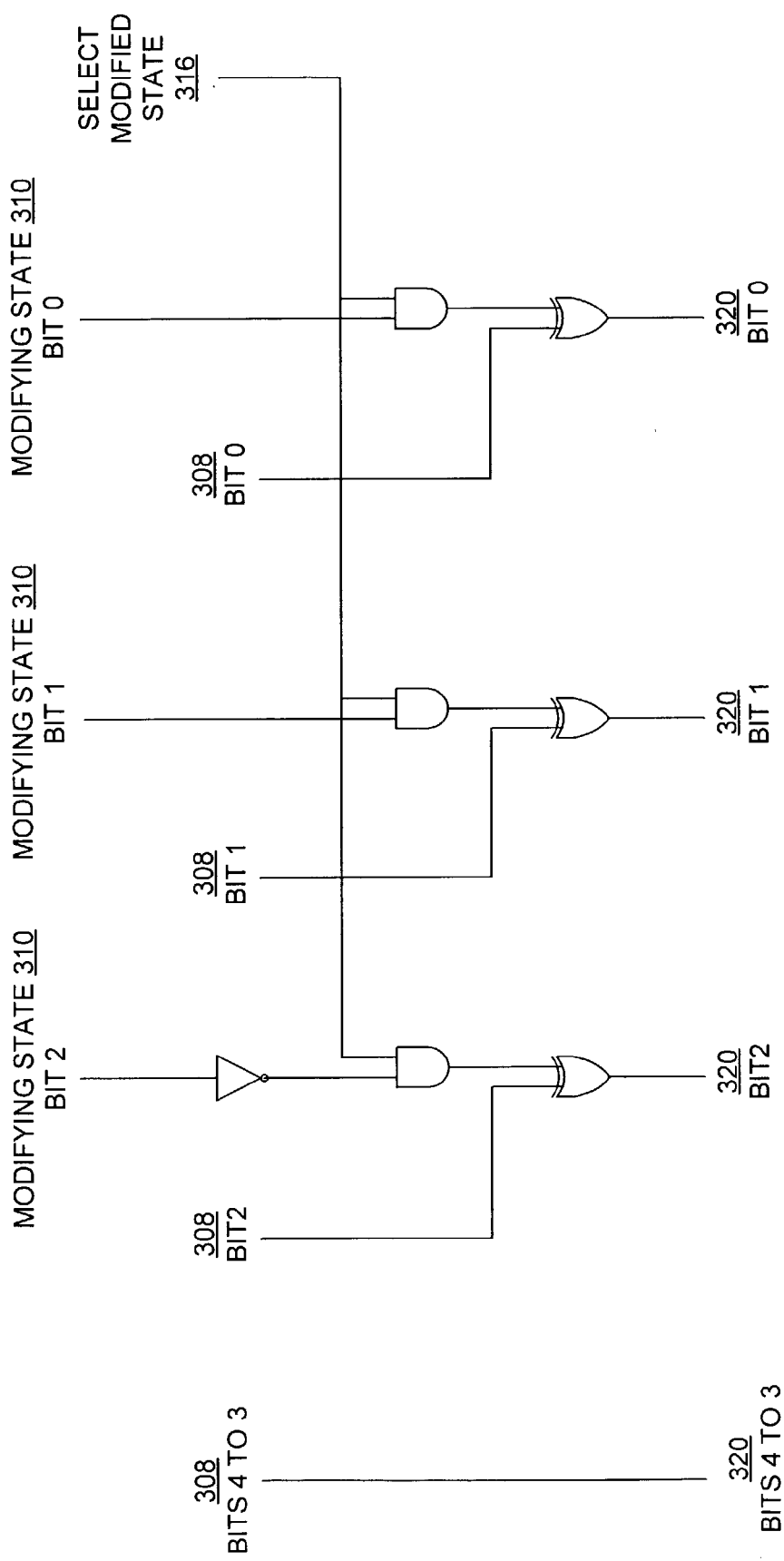

Turning to FIGS. 3B and 3C, an exemplary implementation of a five-bit embodiment of the combine state function 312, accepting a three-bit modifying state 310, and the circuit 318, from FIG. 3A is shown. In the example of FIG. 3B, when the select modified state 316 has a value of '1,' the five-bit selected state value 308 is to be modified with the three-bit modifying state value 310. In this example, the two least significant bits of the selected state value 308 are XORed with the two least significant bits of the modifying state value 310. The next bit of the selected state value 308 is XNORed with the most significant bit of the modifying state value 310. The two most significant bits of the selected state value 308 pass through unchanged, becoming the two most significant bits of the chosen state value 320. When the select modified state 316 has a value of '0,' the unmodified five-bit selected state value 308 is selected as the chosen state value 320.

FIG. 3C shows an exemplary circuit that is functionally equivalent to FIG. 3B. When the select modified state value 316 is '0,' the XOR gates effect no change to the five-bit selected state value 308. When the select modified state value 316 is '1,' the XOR gates make the same modification that is shown in FIG. 3B. Thus, the circuit in FIG. 3C is functionally equivalent to the circuit of FIG. 3B, even though it does not include an actual multiplexer.

Turning to FIG. 4, a flowchart of an embodiment of a method 400 for generating and providing a continuous random number, in accordance with one aspect of the present invention, is shown. The method 400 includes initializing a CRNG with a starting value, or seed, in block 405. The method 400 next, optionally, modifies the current value for a continuous random number using an external source of entropy, in block 410. The method 400 next checks, in decision block 415, if a request for a value of a continuous random number has been received. If the request for a value of a continuous random number has been received in decision block 215, then the method 400 provides the current continuous random number value in response to the request, in block 430, and continues with block 425. If the request for the value of the continuous random number has not been received in decision block 215, then the method 400 generates a new continuous random number value from the current continuous random number value, in block 425, and continues with block 410.

Figure 5A:
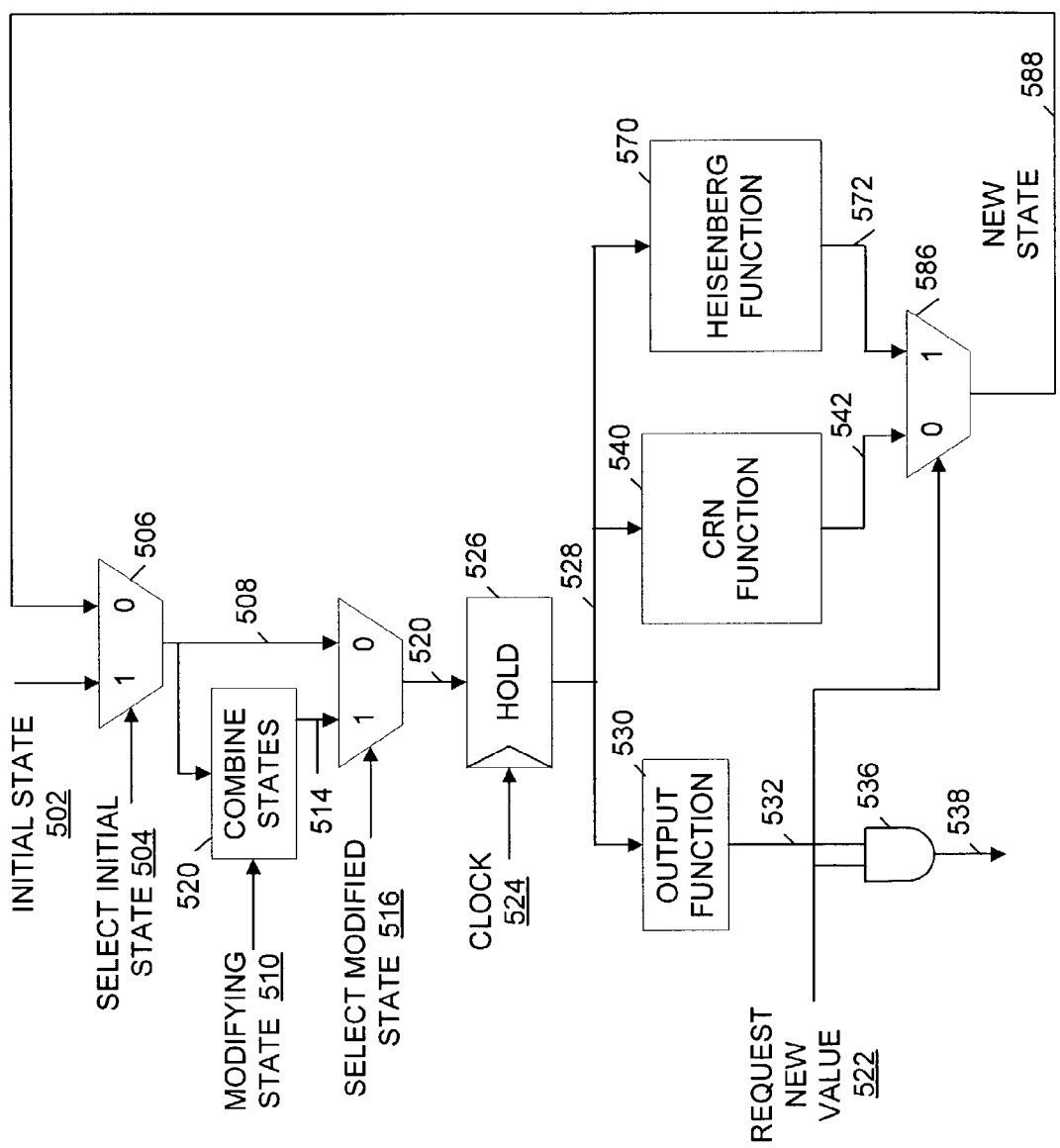
FIG. 5A illustrates a block diagram of an embodiment of a CRNG that includes a Heisenberg function, in accordance with one aspect of the present invention.

Turning now to FIG. 5A, a block diagram of an embodiment of a CRNG 500 that includes a Heisenberg function 570, in accordance with one aspect of the present invention, is shown. The Heisenberg function 570 is so called because on an analogy with the Heisenberg uncertainty principle in physics. If one were to observe very accurately the location of an electron, then according to a popular interpretation of the Heisenberg principle, the velocity of that electron cannot be determined with much precision. Thus, the electron's location in the future cannot be absolutely known. The very act of observation is believed to affect what is being observed. This concept is here applied to continuous random number generation. When no request is made for a value, the CRNG function 540 is used to generate the new value. "Looking at a value," i.e., a request is made, changes "what was looked at," i.e., a jump in the internal state from what the internal state would otherwise have been. Since the CRNG 500 performs iterations based on an independent input signal (e.g., the clock 524), and not based on when a request is made, and the requests arrive at random times, the behavior is unpredictable, as the above discussion of inter-arrival times stated. The entropy of inter-arrival times is injected into the internal state as the algorithm used changes for each clock when there is a request." A continuous random number generator 100, 300 with a Heisenberg function 570 is called a Heisenberg random number generator (HRNG) 500.

As shown in FIG. 5A, an initial state value 502 and a new state value 588 are provided to a multiplexer 506. A selected state value 508 is chosen between the initial state value 502 and the new state value 588 using a select initial state value 504 to the multiplexer 506.

The selected state value 508 is provided to a combine state function 512 along with a modifying state value 510. The combine state function 512 produces a combined state value 514. The chosen state value 508 and the combined state value 514 are provided to a multiplexer 518. A chosen state value 520 is chosen between the selected state value 508 and the combined state value 514 using a select modified state value 516 to the multiplexer 518. The chosen state value 520 is provided to a register 526, which latches upon a clock 524.

A value 528 is provided from the register 526 to an optional output function 530, to a continuous random number function 540, and to the Heisenberg function 570. The Heisenberg function 570 is any function that produces different results than the continuous random number function 540 for at least some input values. The continuous random number function 540 generates value 542. The Heisenberg function 570 generates value 572. The value 542 and the value 572 are provided to a multiplexer 586. The new state value 588 is selected between the value 542 and the value 572 using a request for a new value 522 to the multiplexer 586. If there is no request for a new value 522, then value 542 becomes the new state value 588. If there is a request for a new value 522, then the value 572 becomes the new state value 588. The CRN function 540, the Heisenberg function 570, and the multiplexer 586 are functional representations. Other methods that functionally accomplish an equivalent result may be used. For example, see FIG. 5C below.

The new state 588 is provided to the multiplexer 506. The output function 530 may transform the value 528 into a transformed value 532. The transformed value 532 is provided to an output gate (e.g., an AND gate) 536. Upon the request for a new value 522, the transformed value 532 is provided by the AND gate 536 as an output value 538. Recall that the output gate 536 is optional.

Figure 5B:
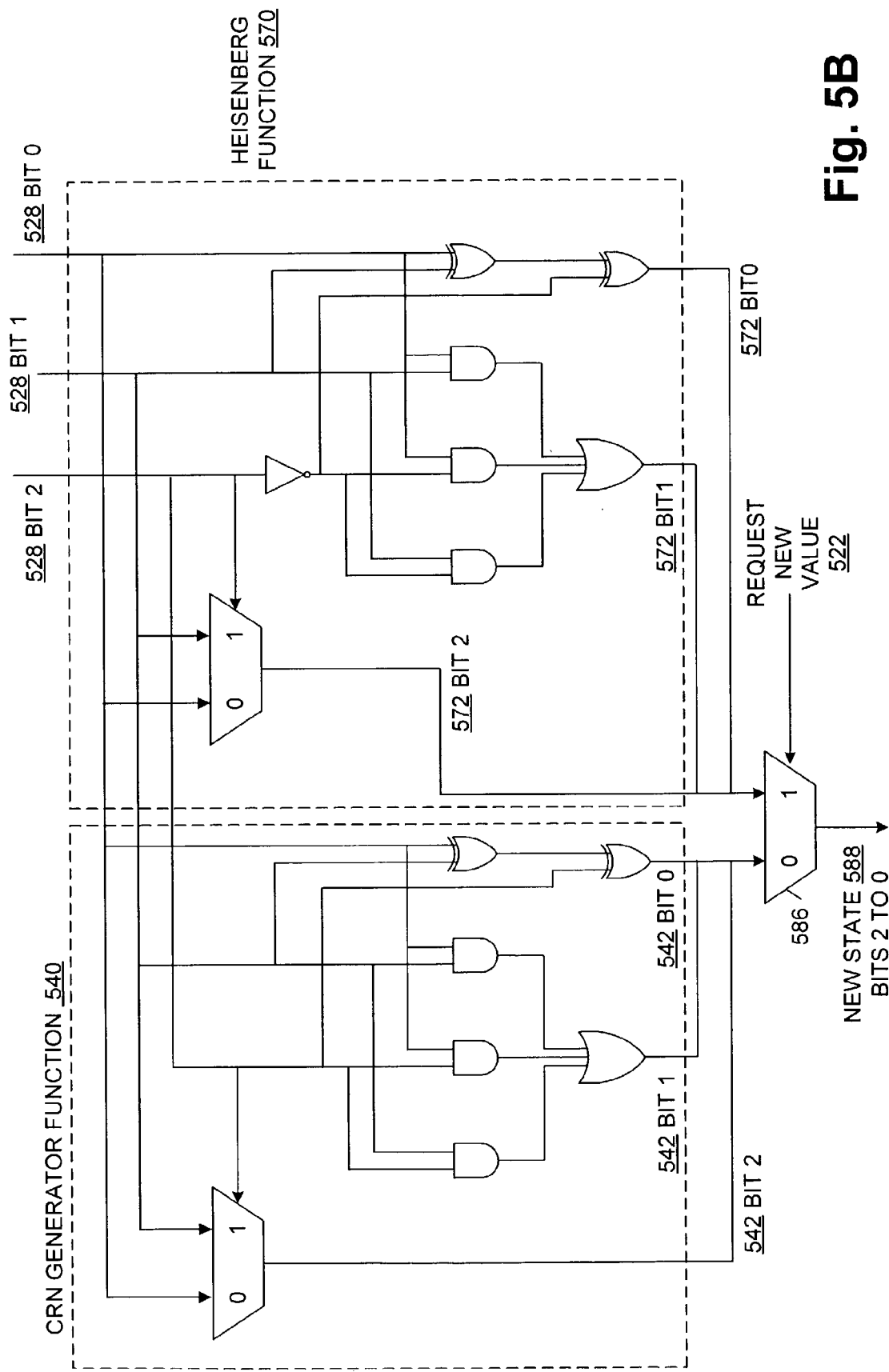

Turning to FIGS. 5B and 5C, an exemplary implementation of a three-bit embodiment of how the CRN function 540 and the Heisenberg function 570 may be integrated with the circuit 586, from FIG. 5A, is shown. In this example, input value 528 includes three bits. The output of the CRN function 540, i.e., value 542, also includes three bits. As shown, the least significant bit of value 543 is the XOR of the three bits of 528. The middle bit of value 542 is the majority value of the three bits in the input value 528, i.e., is '1' when either two to three of the three bits in the input value 528 are '1' and '0' otherwise. The most significant bit of value 542 is the same as the least significant bit of value 528 when the most significant bit of value 528 is '0,' otherwise the most significant bit of value 542 has the value of the middle bit of value 528. The Heisenberg function 570 is similar, except the most significant bit of the input value 528 is complemented before the computation to determine the two least significant bits of value 572.

In FIG. 5C, the CRN function 540, the Heisenberg function 570, and the multiplexer 586 have all been replaced by a single equivalent circuit. The request new value 522 and the most significant bit of value 528 are inputs to an XOR gate. If the request new value 522 is '0,' then the output of the XOR gate is the same as the most significant bit of value 528 and the result to the new state 588 is the output of the CRN function 540 of FIG. 5B. However, if the request new value 522 is '1,' then the output of the XOR gate is the complement of the value of the most significant bit of value 528. The result to the new state 588 is the output of the Heisenberg function 570 of FIG. 5B. Thus, the circuit in FIG. 5C is functionally equivalent to the circuit in FIG. 5B, with neither an actual multiplexer corresponding to the multiplexer 586 nor separate functional units 540 and 570.

Figure 6:
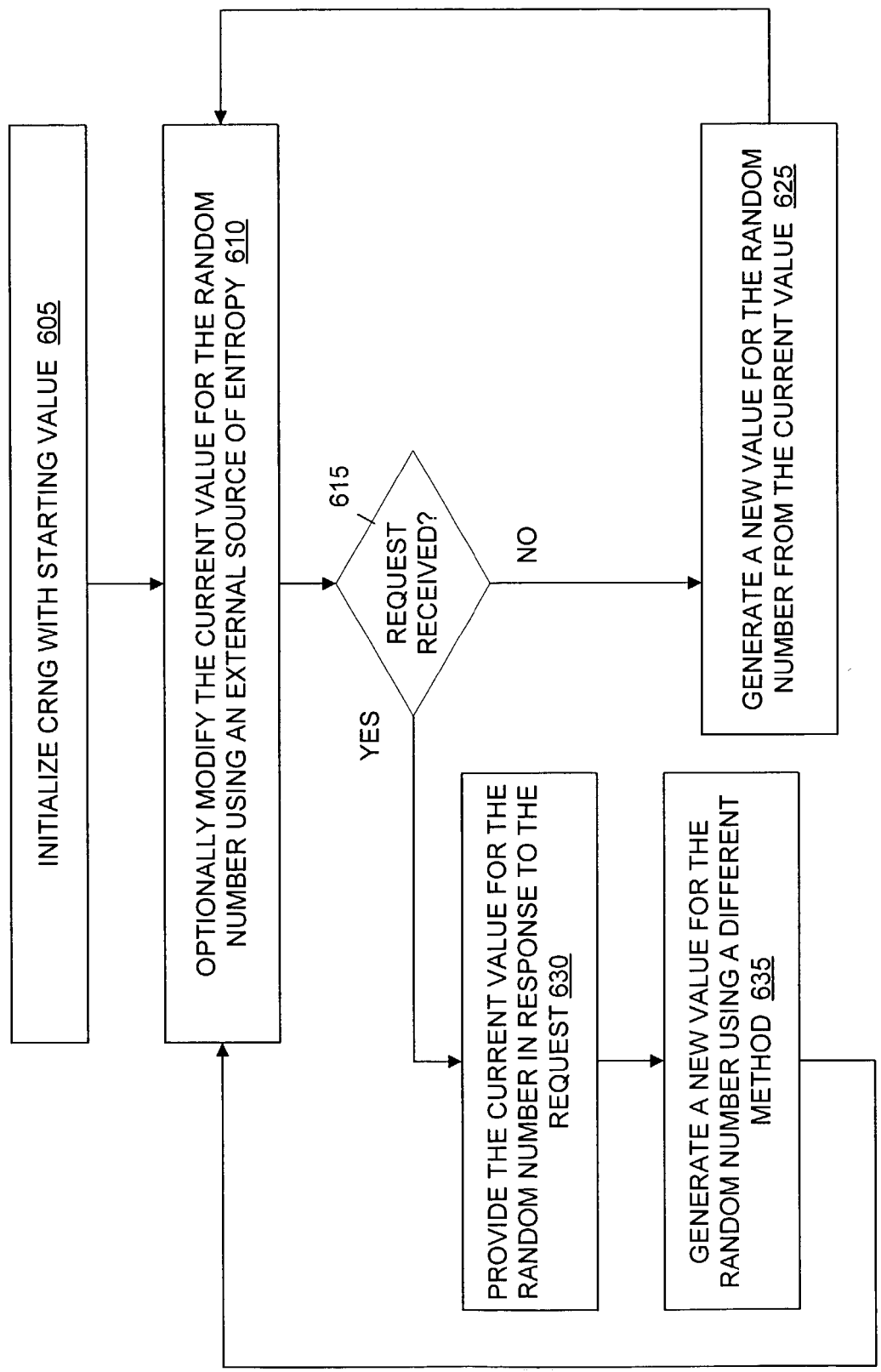
FIG. 6 shows a flowchart of an embodiment of a method for generating and providing a continuous random number, in accordance with one aspect of the present invention.

Turning to FIG. 6, a flowchart of an embodiment of a method 600 for generating and providing a continuous random number, in accordance with one aspect of the present invention, is shown. The method 600 includes initializing a CRNG with a starting value in block 605. The method 600 next, optionally, modifies the current value for a continuous random number using an external source of entropy, in block 610. The method 600 next checks, in decision block 615, if a request for a value of a continuous random number has been received. If the request for the value of the continuous random number has not been received in decision block 615, then the method 600 generates a new continuous random number value from the current continuous random number value, in block 625, and continues with block 610. If the request for a value of a continuous random number has been received in decision block 615, then the method 600 provides the current continuous random number value in response to the request, in block 630, generates a new continuous random number value using a different continuous random number function or method, in block 635, and continues with block 610. In one embodiment, generating a new continuous random number value using a different continuous random number function or method, in block 635 includes using a Heisenberg function, such as described with respect to FIGS. 5A, 5B, and 5C.

Figure 7:
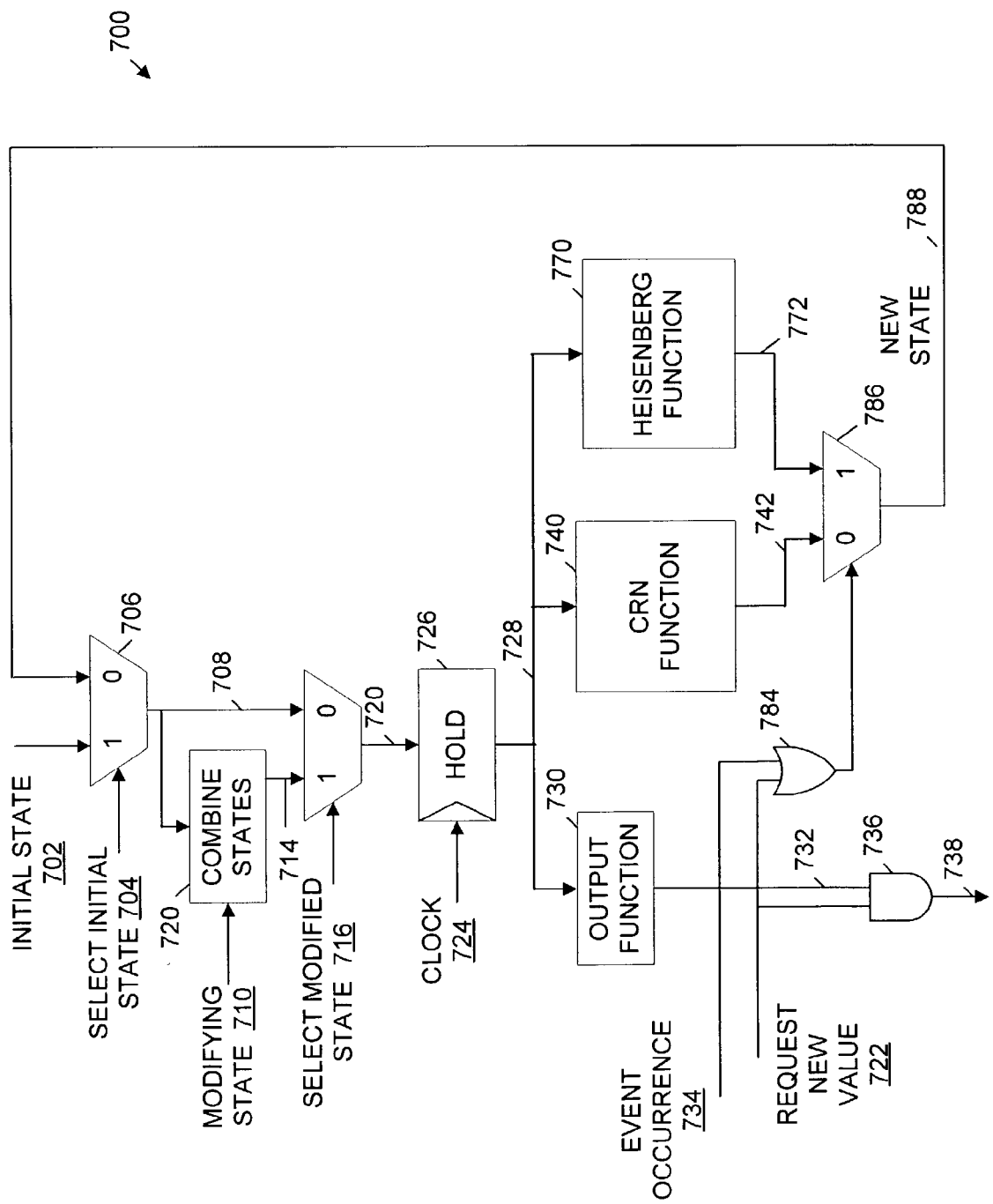
FIG. 7 illustrates a block diagram of an embodiment of a CRNG that includes a Heisenberg function that is selected by a request or an event, in accordance with one aspect of the present invention.

Turning now to FIG. 7, a block diagram of an embodiment of a CRNG 700 that includes a Heisenberg function 770 (i.e., a HRNG 700) that is selected either by a request for a new value 722 or by an event occurrence 734, in accordance with one aspect of the present invention, is shown. An initial state value 702 and a new state value 788 are provided to a multiplexer 706. A selected state value 708 is chosen between the initial state value 702 and the new state value 788 using a select initial state value 704 to the multiplexer 706.

The selected state value 708 is provided to a combine state function 712 along with a modifying state value 710. The combine state function 712 produces a combined state value 714. The chosen state value 708 and the combined state value 714 are provided to a multiplexer 718. A chosen state value 720 is chosen between the selected state value 708 and the combined state value 714 using a select modified state value 716 to the multiplexer 718. The chosen state value 720 is provided to a register 726, which latches upon a clock 724.

A value 728 is provided from the register 726 to an output function 730, to a continuous random number function 740, and to a Heisenberg function 770. The continuous random number function 740 generates an iteration value 742. The Heisenberg function 770 generates a Heisenberg value 772. The iteration value 742 and the value 772 are provided to a multiplexer 786. The new state value 788 is selected between the iteration value 742 and the value 772 using an output of an OR gate 784. The OR gate 784 input signals are the request for the new value 722 and the event occurrence 734.

The new state 788 is provided to the multiplexer 706. The output function 730 may transform the value 728 into a transformed value 732. The transformed value 732 is provided to an AND gate 736. Upon the request for a new value 722, the transformed value 732 is provided by the AND gate 736 as an output value 738.

The event occurrence 734 may be any signal, presumably one that appears to come at a random time, any of the following signals could be used as an event occurrence: a trap, an interrupt, or a cache miss. Further, if a TRN generator is available, an event could be when it produces an output of '1.' The use of an event occurrence enables the CRN generator to arrive at an unknown random internal state after the computer has been turned on but before the very first request for a random number is made. Note that the functionality description of FIGS. 5B and 5C also apply to FIG. 7, with the change of having the addition of the event occurrence signal 734 ORed with the request for new value 722.

Figure 8:
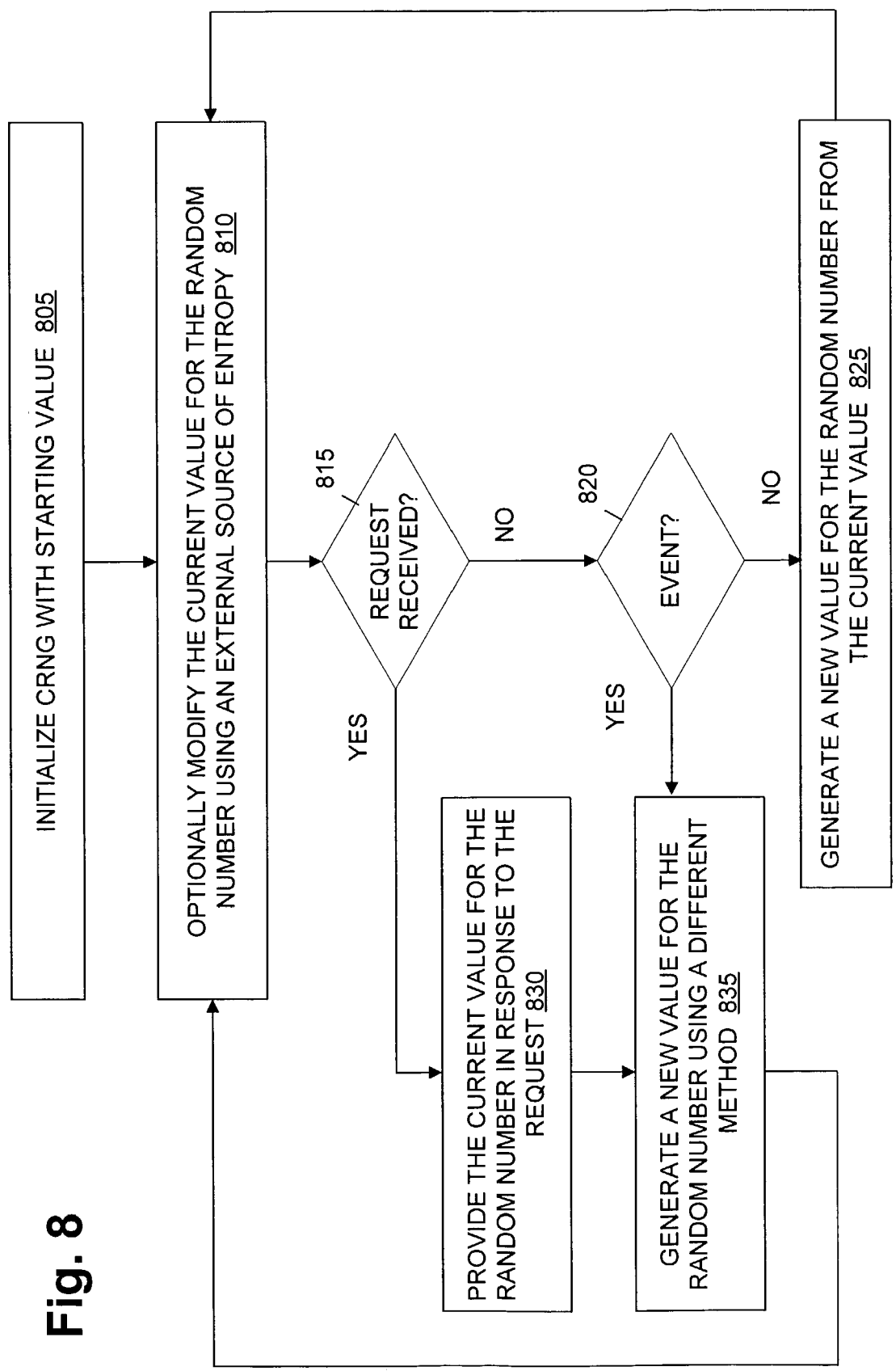
FIG. 8 shows a flowchart of an embodiment of a method for generating and providing a continuous random number including an event function, in accordance with one aspect of the present invention.

Turning to FIG. 8, a flowchart of an embodiment of a method 800 for generating and providing a continuous random number including an event function, in accordance with one aspect of the present invention, is shown. The method 800 includes initializing a CRNG with a starting value in block 805. The method 800 next, optionally, modifies the current value for a continuous random number using an external source of entropy, in block 810. The method 800 next checks, in decision block 815, if a request for a value of a continuous random number has been received. If the request for a value of a continuous random number has been received in decision block 815, then the method 800 moves to block 830. If the request for the value of the continuous random number has not been received in decision block 815, then the method 800 moves to decision block 820.

The method 800 checks, in decision block 820, if an event occurrence notification has been received. If the event occurrence notification has been received in decision block 820, then the method 800 moves to block 835. If the event occurrence notification has not been received in decision block 820, then the method moves to block 825. The method 800 generates a new continuous random number value from the current continuous random number value, in block 825, and continues with block 810.

The method 800 provides the current continuous random number value in response to the request, in block 830, and moves to block 835. The method 800 generates a new continuous random number value using a different continuous random number function or method, in block 835, and continues with block 810.

In one embodiment, generating a new continuous random number value using a different continuous random number function or method, in block 835, the Heisenberg function 770, etc., such as in block 635. The event occurrence, in decision block 820, is whenever an event that is being monitored occurs, such as the event occurrence 734, etc.

Figure 9A:
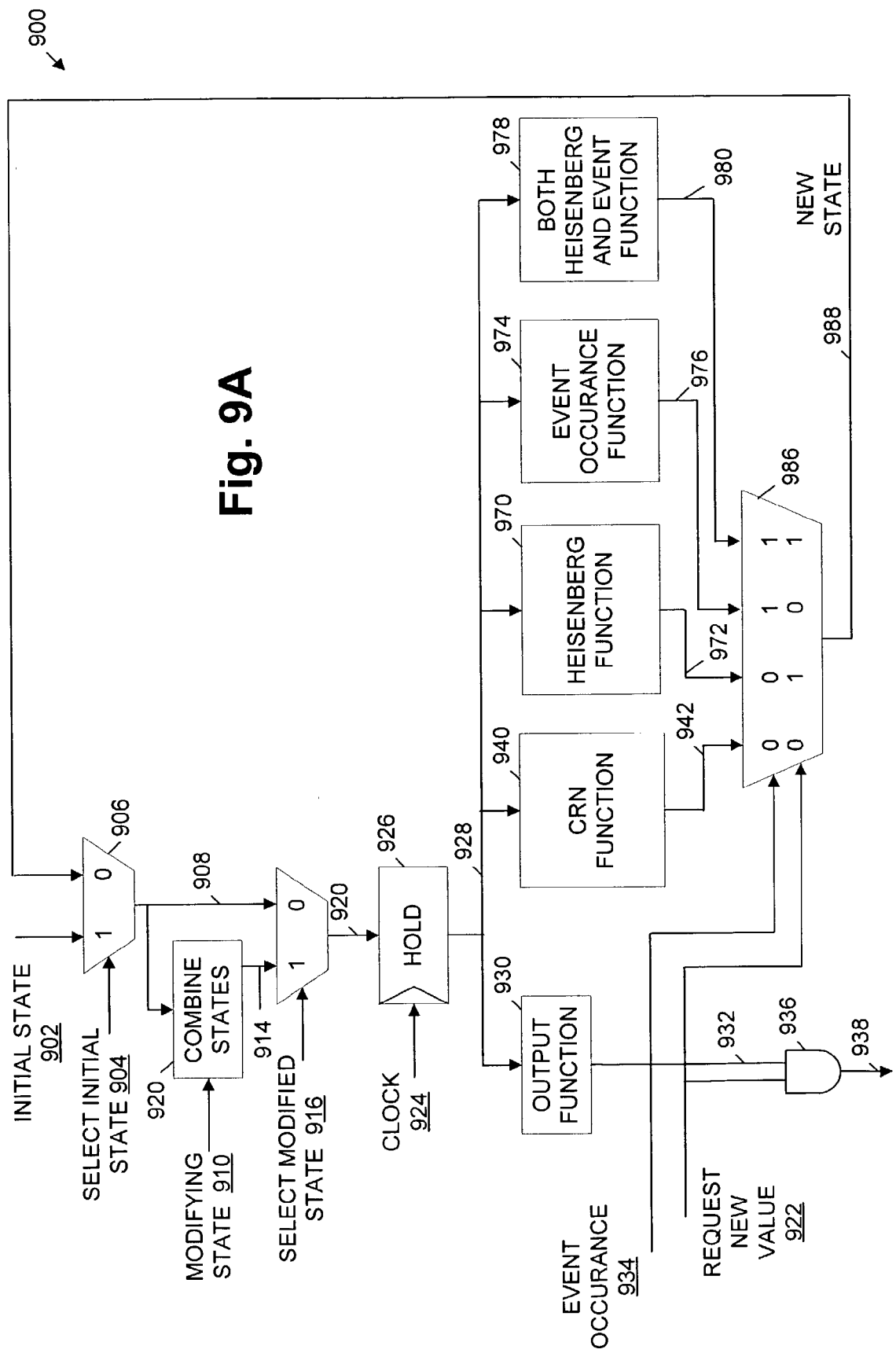
FIG. 9A shows a block diagram of an embodiment of a CRNG that includes a Heisenberg function, an event occurrence function, and a Heisenberg/event function, in accordance with one aspect of the present invention.

Turning now to FIG. 9A, a block diagram of an embodiment of a CRNG 900 that includes a Heisenberg function 970 (i.e., a HRNG 900), an event occurrence function 974, and a Heisenberg/event function 978, in accordance with one aspect of the present invention, is shown. An initial state value 902 and a new state value 988 are provided to a multiplexer 906. A selected state value 908 is chosen between the initial state value 902 and the new state value 988 using a select initial state value 904 to the multiplexer 906.

The selected state value 908 is provided to a combine state function 912 along with a modifying state value 910. The combine state function 912 produces a combined state value 914. The chosen state value 908 and the combined state value 914 are provided to a multiplexer 918. A chosen state value 920 is chosen between the selected state value 908 and the combined state value 914 using a select modified state value 916 to the multiplexer 918. The chosen state value 920 is provided to a register 926, which latches upon a clock 924.

A value 928 is provided from the register 926 to an output function 930, to a continuous random number function 940, the Heisenberg function 970, the event occurrence function 974, and the Heisenberg/event function 978. The continuous random number function 940 generates an iteration value 942. The Heisenberg function 970 generates a Heisenberg value 972. The event occurrence function 974 generates an event value 976. The Heisenberg/event function 978 generates a Heisenberg/event value 980. The iteration value 942, the Heisenberg value 972, the event value 976, and the Heisenberg/event value 980 are provided to a multiplexer 986. The new state value 988 is selected between the iteration value 942, the Heisenberg value 972, the event value 976, and the Heisenberg/event value 980 using the 934 and the signal 922. As in FIG. 5A, the CRN function 940, the Heisenberg function 970, the event occurrence function 974, and the Heisenberg/event function 978, and the multiplexer 986 are functional representation. Other methods may be used that functionally accomplish the equivalent result. Continuing the example of FIGS. 5B and 5C, consider FIGS. 9B and 9C below.

The new state 988 is provided to the multiplexer 906. The output function 930 may transform the value 928 into a transformed value 932. The transformed value 932 is provided to an AND gate 936. Upon the request for a new value 922, the transformed value 932 is provided by the AND gate 936 as an output value 938.

The event occurrence function 974 is any function different from 940 and 970. The Heisenberg/event function 978 is any function different from 940, 970, and 974.

Figure 9B:
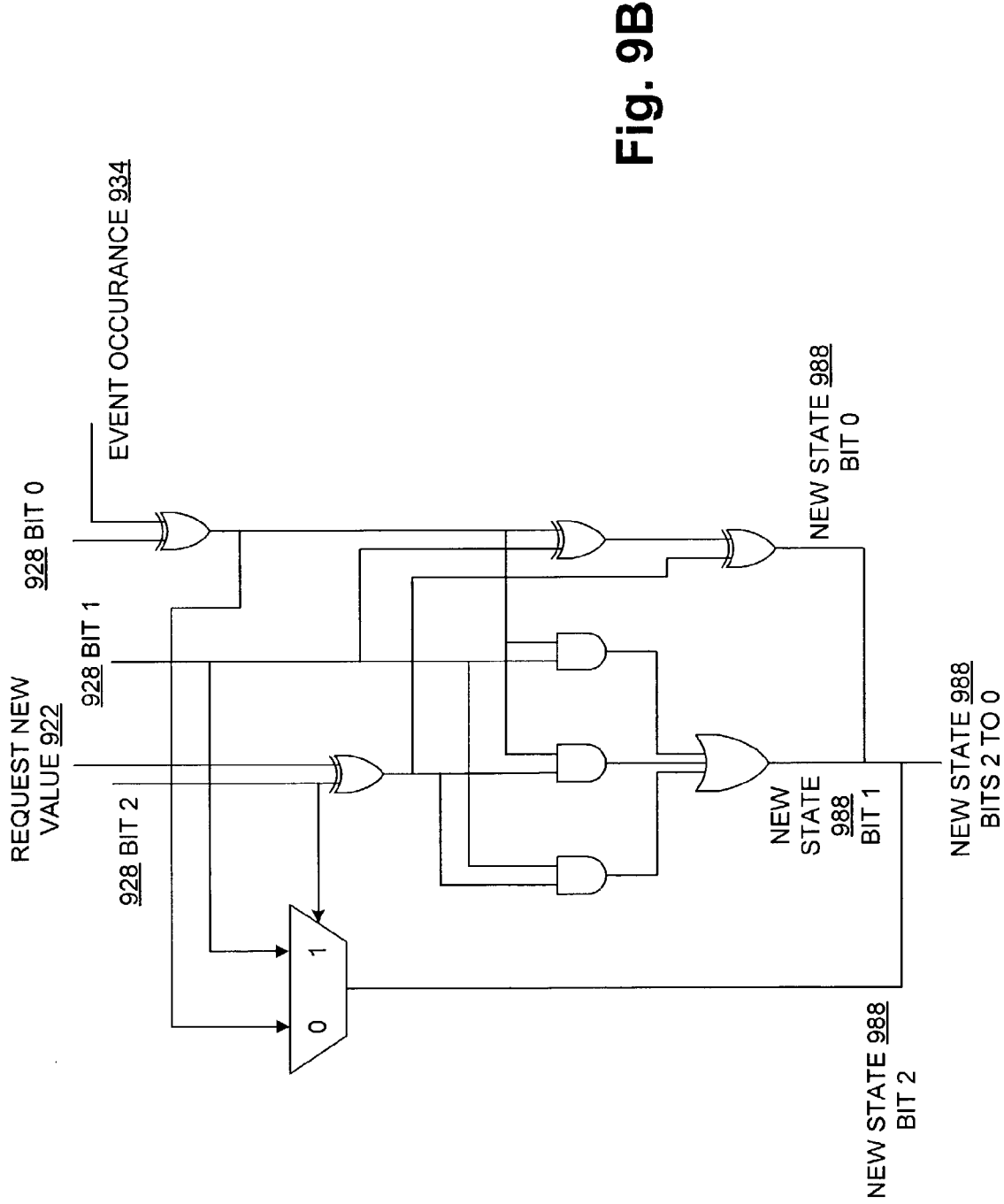
FIGS. 9B and 9C illustrate an exemplary implementation of a three-bit embodiment of how the Heisenberg function, the event occurrence function, and the Heisenberg/event function may be integrated with the circuit 986, shown in FIG. 9A.
Figure 9C:
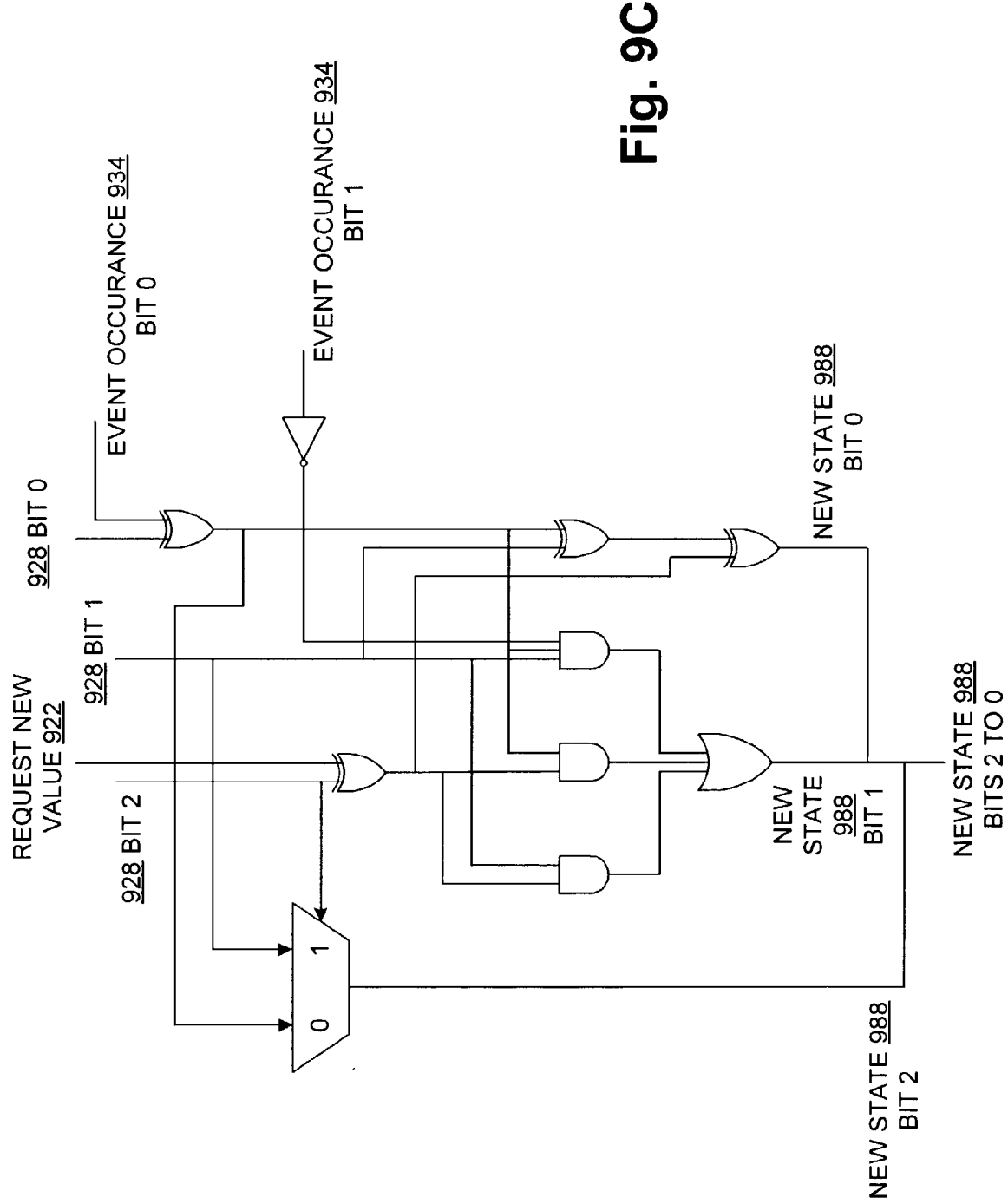

Turning to FIGS. 9B and 9C, an exemplary implementation of a three-bit embodiment of how the CRN function 940, Heisenberg function 970, the event occurrence function 974, and the Heisenberg/event function 978 may be integrated with the circuit 986, of FIG. 9A is shown. Compared to FIG. 5C, in FIG. 9B an additional XOR gate has been added with inputs from the least significant bit of value 928 and the event occurrence 934. When the event occurrence is '0,' the results of the CRN function 940 or the Heisenberg function 970 are provided, depending on the value of the request for the new value 922. When the event occurrence is '1,' the results of the event occurrence function 974 or the Heisenberg/event function 978 are provided, depending on the value of the request for the new value 922. Note that in the circuit of FIG. 9B, there is no multiplexer 986, but the circuit of FIG. 9B includes the functionality of the four functions 940, 970, 974, 978 followed by the multiplexer 986 shown in FIG. 9A.

In the example of FIG. 9C, the event occurrence function 974 has two bits, one bit for each of two different events. This is functionally equivalent to value 928 being input to eight different functions and an eight-to-one multiplexer selecting which function to use. As noted herein, there are several variables in a computer that behave in an unpredictable manner. These variables include the occurrences of interrupts, traps, and cache misses. Any such set of events may be used to provide more random behavior to the state 988.

In an embodiment having the output of a true random number generator, then an event could be when the output of the TRN generator is '1.' An alternative event could be when the output of the TRN generator is '0.' TRN generators typically produce bits at a slow output rate. Using a TRN generator as an event source with a CRNG can provide a large number of random bits per clock. Further, it may be difficult to ensure that there is no bias or correlation in the output of the TRN generator. When used as an event source to a CRNG, the presence of some bias or correlation is not important so long as there is some entropy in the TRN generator output.

In another embodiment, the occurrence of interrupts provides entropy as the event occurrence 934, as they may come from a source outside both the CRNG 900 and the system including the CRNG 900, e.g., a computer chip, a computer system, etc. Even with the system, the timing of the occurrence of interrupts is often unpredictable. For a specific example, consider the interrupt generated by a disk drive signaling the completion of a data transfer. The number of clock cycles it takes to complete the data transfer depends on the rotational speed of the disk drive. The rotational speed cannot be controlled to an accuracy of two or three nanoseconds for even a signal rotation, let alone multiple rotations. Thus, even if the exact same execution were repeated, the CRNG 900 would produce different results.

Figure 10:
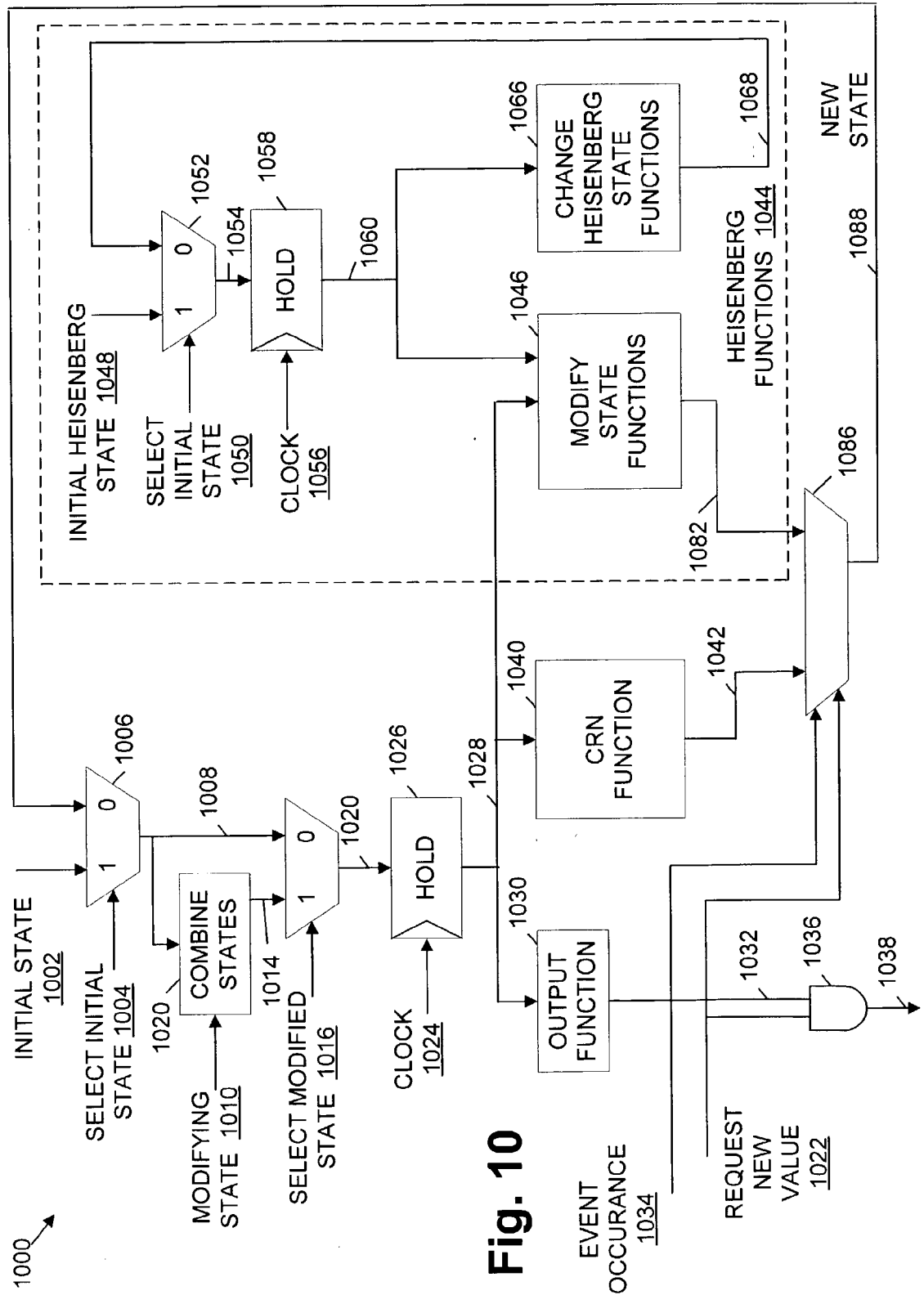
FIG. 10 shows a block diagram of an embodiment of a CRNG that includes Heisenberg functions, in accordance with one aspect of the present invention.

Turning now to FIG. 10, a block diagram of an embodiment of a CRNG 1000 that includes Heisenberg functions 1044 (i.e., a HRNG 1000), in accordance with one aspect of the present invention, is shown. An initial state value 1002 and a new state value 1088 are provided to a multiplexer 1006. A selected state value 1008 is chosen between the initial state value 1002 and the new state value 1088 using a select initial state value 1004 to the multiplexer 1006.

The selected state value 1008 is provided to a combine state function 1012 along with a modifying state value 1010. The combine state function 1012 produces a combined state value 1014. The chosen state value 1008 and the combined state value 1014 are provided to a multiplexer 1018. A chosen state value 1020 is chosen between the selected state value 1008 and the combined state value 1014 using a select modified state value 1016 to the multiplexer 1018. The chosen state value 1020 is provided to a register 1026, which latches upon a clock 1024.

A value 1028 is provided from the register 1026 to an output function 1030, to a continuous random number function 1040, and to modify state functions 1046, which are a part of the Heisenberg functions 1044. The CRN function 1040 generates a value 1042. The modify state functions 1046 generate modified state values 1082. The value 1042 and the modified state values 1082 are provided to a multiplexer 1086. The new state value 1088 is selected between or among the value 1042 and the modified state values 1082 using the request for the new value 1022 and the event occurrences 1034.

The Heisenberg functions 1044 are initialized with initial Heisenberg state values 1048 and new Heisenberg state values 1068 provided to a multiplexer 1052. Selected Heisenberg state values 1054 are chosen from the initial Heisenberg state values 1048 and the new Heisenberg state values 1068 using select initial Heisenberg state values 1050 provided to the multiplexer 1052. Note that mux 1052 is a functional representation and can be implemented in different ways as is the case with muxes 106, 306, 506, 706, 906, and 1006.

The selected Heisenberg state values 1054 are provided to registers 1058, which latch upon a clock 1056. Values 1060 are provided from the registers 1058 to the modify Heisenberg state functions 1046 and a change Heisenberg state functions 1066. The change Heisenberg state functions 1066 provide the new Heisenberg state values 1068.

The Heisenberg functions 1044 may include one or more of the functions 970, 974, and 978 of FIGS. 9A, 9B, and 9C. There are potentially a plurality of independent Heisenberg functions 1044 in any embodiment, and there may be many Heisenberg functions 1044 in an embodiment. Note the correspondence between the Heisenberg function 770, which in one embodiment is an alternative CRN function 740, and the Heisenberg functions 1044, which in one embodiment are an alternative CRNG 700. Note also the correspondence in the relationship between the CRN function 740 and Heisenberg function 770 with the relationship between the modify state functions 1046 and the change Heisenberg state function 1066. Note that the Heisenberg functions 1004 are functionally similar to the CRNG 100.

Figure 11:
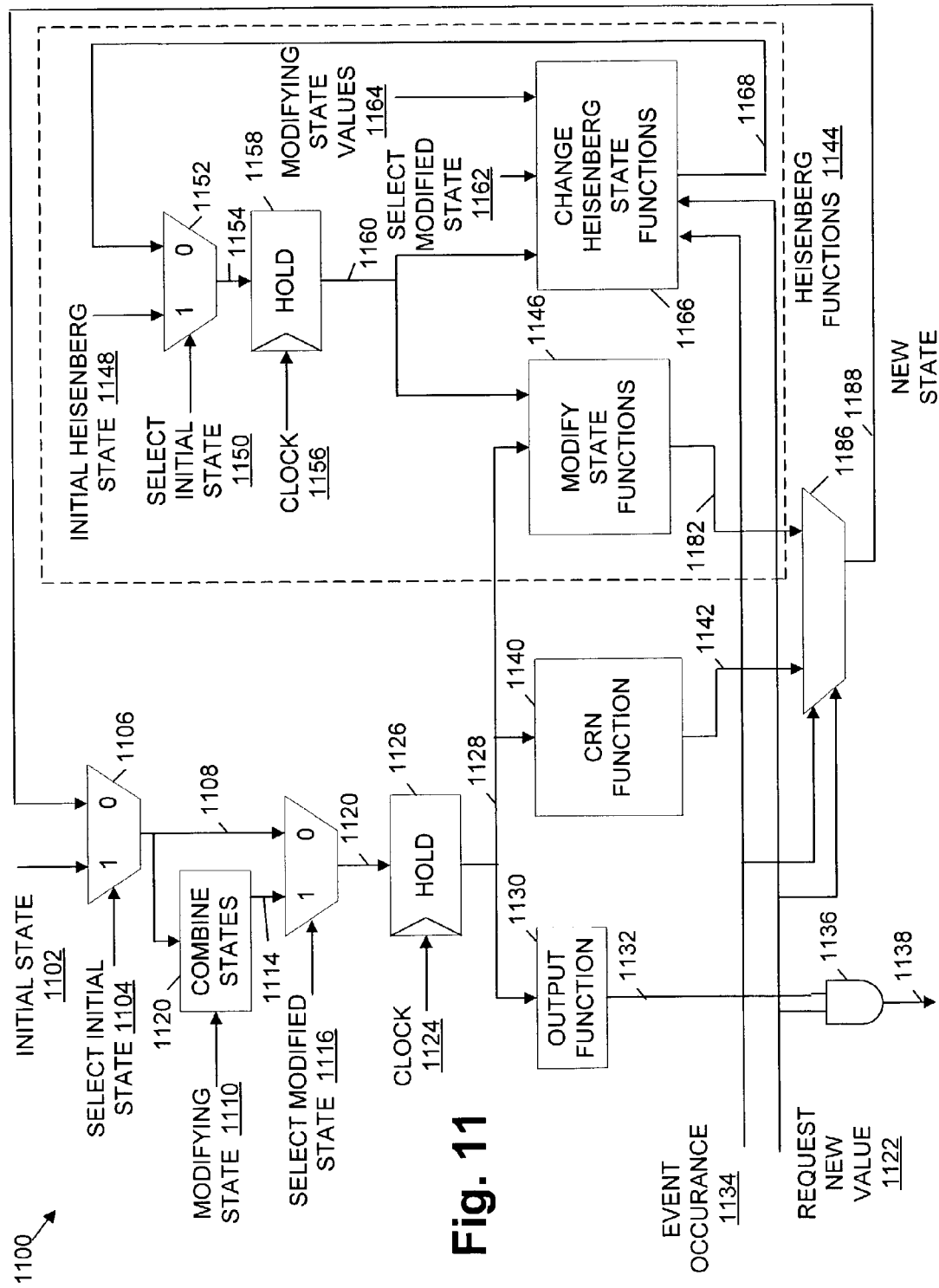
FIG. 11 shows a block diagram of an embodiment of a CRNG that includes changes to Heisenberg functions, in accordance with one aspect of the present invention.

Turning now to FIG. 11, a block diagram of an embodiment of a CRNG 1100 that includes Heisenberg functions 1144 (i.e., a HRNG 1100), in accordance with one aspect of the present invention, is shown. An initial state value 1102 and a new state value 1188 are provided to a multiplexer 1106. A selected state value 1108 is chosen between the initial state value 1102 and the new state value 1188 using a select initial state value 1104 to the multiplexer 1106.

The selected state value 1108 is provided to a combine state function 1112 along with a modifying state value 1111. The combine state function 1112 produces a combined state value 1114. The chosen state value 1108 and the combined state value 1114 are provided to a multiplexer 1118. A chosen state value 1120 is chosen between the selected state value 1108 and the combined state value 1114 using a select modified state value 1116 to the multiplexer 1118. The chosen state value 1120 is provided to a register 1126, which latches upon a clock 1124.

A value 1128 is provided from the register 1126 to an output function 1130, to a continuous random number function 1140, and to modify state functions 1146, which are a part of the Heisenberg functions 1144. The continuous random number function 1140 generates an iteration value 1142. The modify state functions 1146 generate modified state values 1182. The iteration value 1142 and the modified state values 1182 are provided to a multiplexer 1186. The new state value 1188 is selected between or among the iteration value 1142 and the modified state values 1182 using the request for the new value 1122 and the event occurrences 1134.

The Heisenberg functions 1144 are initialized with initial Heisenberg state values 1148 and new Heisenberg state values 1168 provided to a multiplexer 1152. Selected Heisenberg state values 1154 are chosen between or among the initial Heisenberg state values 1148 and the new Heisenberg state values 1168 using a select initial Heisenberg state value 1150 provided to the multiplexer 1152.

The selected Heisenberg state values 1154 are provided to registers 1158, which latch upon a clock 1156. Values 1160 are provided from the registers 1158 to the modify Heisenberg state functions 1146 and a change Heisenberg state functions 1166. The change Heisenberg state functions 1166 are provided with the request for a new value 1122, the event occurrence value(s) 1134, select modified Heisenberg state value(s) 1162, and Heisenberg modifying state values 1164. The change Heisenberg state functions 1166 provide the new Heisenberg state values 1168.

Note that the CRNG 1100 of FIG. 11 is related to the CRNG 1000 of FIG. 10 in a similar way that the CRNG 1000 of FIG. 10 is related to the CRNG 700 of FIG. 7. Note that the change Heisenberg state functions 1166 may be an embodiment of the Heisenberg functions 1044. This nesting process could be continued more times.

Figure 12:
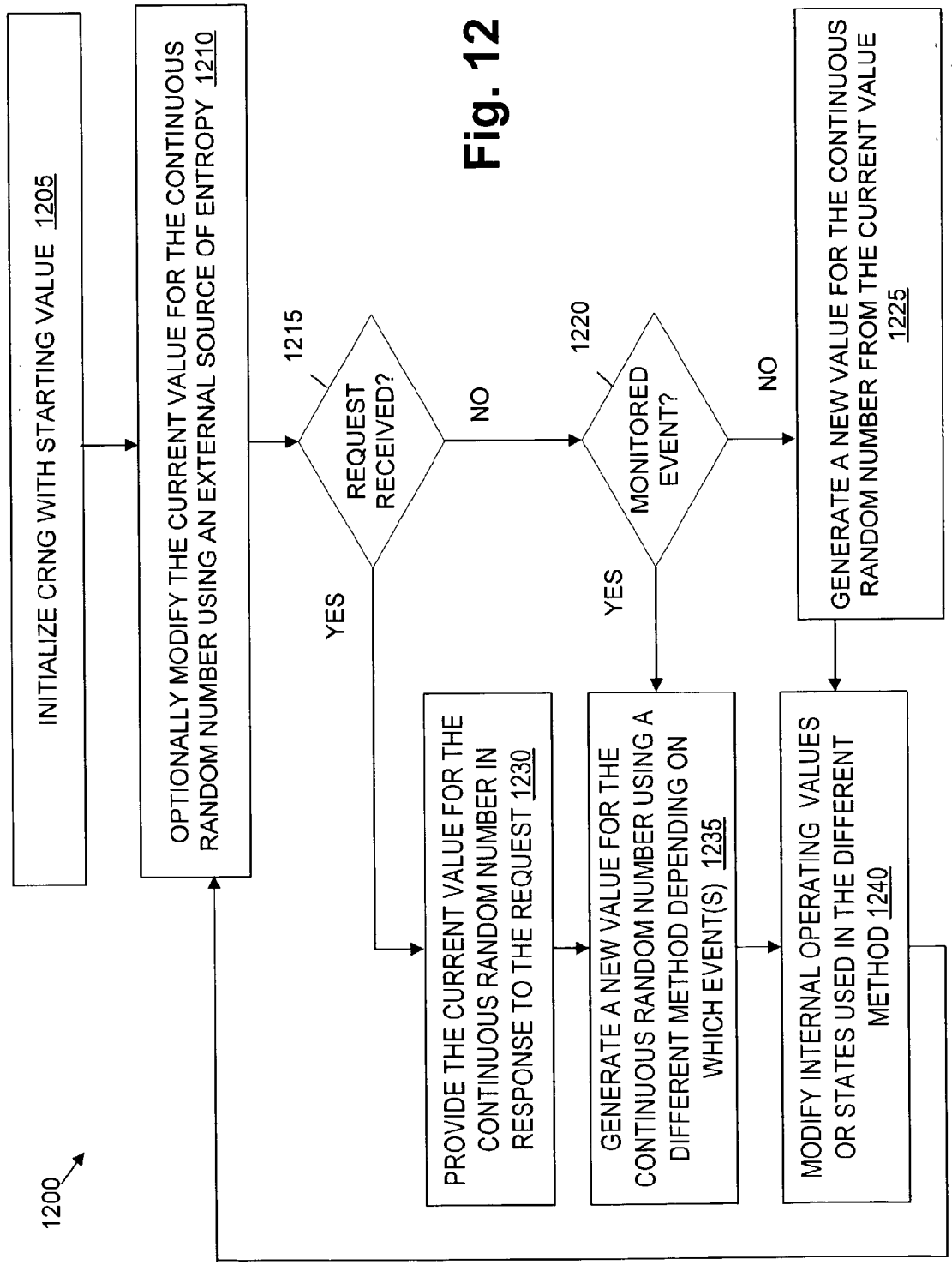
FIG. 12 shows a flowchart of an embodiment of a method 1200 for generating and providing a continuous random number including event function(s) and value modification, in accordance with one aspect of the present invention.

Turning to FIG. 12, a flowchart of an embodiment of a method 1200 for generating and providing a continuous random number including event function(s) and value modification, in accordance with one aspect of the present invention, is shown. The method 1200 of FIG. 12 includes initializing a CRNG with a starting value in block 1205. The method 1200 next, optionally, modifies the current value for a continuous random number using an external source of entropy, in block 1210. The method 1200 next checks, in decision block 1215, if a request for a value of a continuous random number has been received. If the request for a value of a continuous random number has been received in decision block 1215, then the method 1200 moves to block 1230. If the request for the value of the continuous random number has not been received in decision block 1215, then the method 1200 moves to decision block 1220.

The method 1200 checks, in decision block 1220, if an event occurrence notification has been received. If the event occurrence notification has been received in decision block 1220, then the method 1200 moves to block 1235. If the event occurrence notification has not been received in decision block 1220, then the method 1200 moves to block 1225. The method 1200 generates a new continuous random number value from the current continuous random number value, in block 1225, and continues with block 1240.

The method 1200 provides the current continuous random number value in response to the request, in block 1230, and moves to block 1235. The method 1200 generates a new continuous random number value using a different continuous random number function or method, in block 1235, and moves to block 1240. The method 1200 modifies internal operating values or states used in the different continuous random number function or method, in block 1240, and continues with block 1210.

In various embodiments, modifying internal operating values or states used in the different continuous random number function or method, in block 1240, corresponds to the operation of a Heisenberg function or functions as described herein. Note that multiple events may be monitored, with the same or different responses from the method 1200 for any given monitored event.

For each iteration of the method 1200, a value of the continuous random number may be provided or not. For each iteration of the method 1200, a new value is generated by any of a plurality of functions. Also, for each iteration of the method 1200, one or more of the ways of generating the new value may change. Note that the activities for each iteration of the method 1200 are independent of each other.

Figure 13:
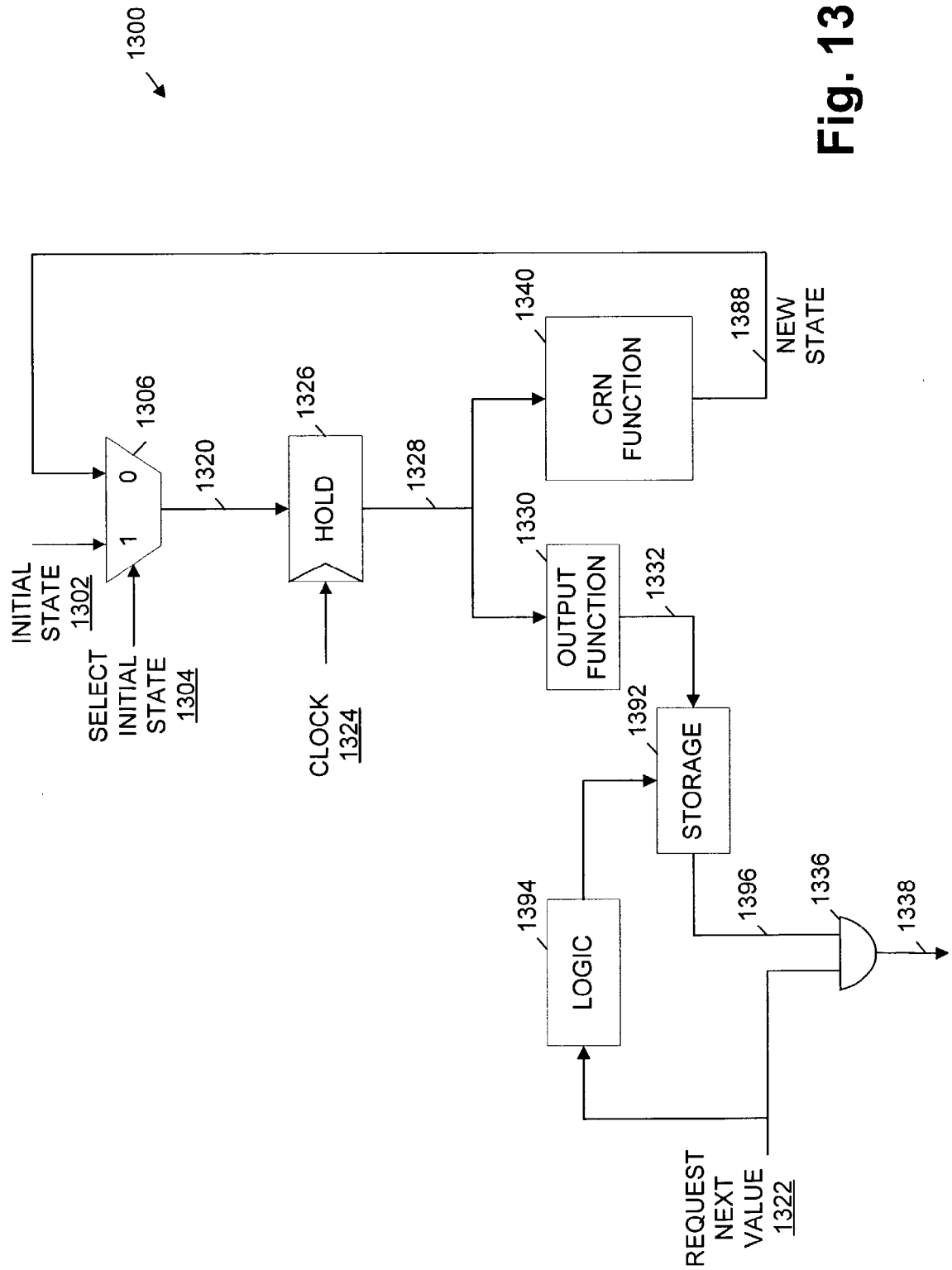
FIG. 13 shows a block diagram of an embodiment of a CRNG that includes storage and logic, in accordance with one aspect of the present invention.

Turning now to FIG. 13, a block diagram of an embodiment of a CRNG 1300 that includes storage 1392 and logic 1394, in accordance with one aspect of the present invention, is shown. The storage 1392 may include one or more registers. Enough storage locations are provided to be able to satisfy an expected short burst of requests for next values 1322 that may arrive faster than the rate of the clock 1324. This could happen if the clock 1324 were slower than the system clock, as would be appropriate if the CRN function 1340 required more than one system clock to complete an iteration. An initial state value 1302 and a new state value 1388 are provided to a multiplexer 1306. A chosen state value 1320 is chosen between the initial state value 1302 and the new state value 1388 using a select initial state value 1304 to the multiplexer 1306. The chosen state value 1320 is provided to a register 1326, which latches upon a request for a new iteration 1324.

A value 1328 is provided from the register 1326 to an output function 1330 and to a continuous random number function 1340. The continuous random number function 1340 generates a new state (or a new value) 1388. The new state 1388 is provided to the multiplexer 1306. The output function 1330 may transform the value 1328 into a transformed value 1332. The transformed value 1332 is provided to the storage 1392. The logic 1394 receives a request for a new value 1322 and is coupled to control the storage 1392. When the request for a new value 1322 is received at an AND gate 1336 as well as the logic 1394, a stored value 1396 is provided by to the AND gate from the storage 1392 as directed by the logic 1394. The AND gate 1336 provides the stored value 1396 as an output value 1338.

Figure 14:
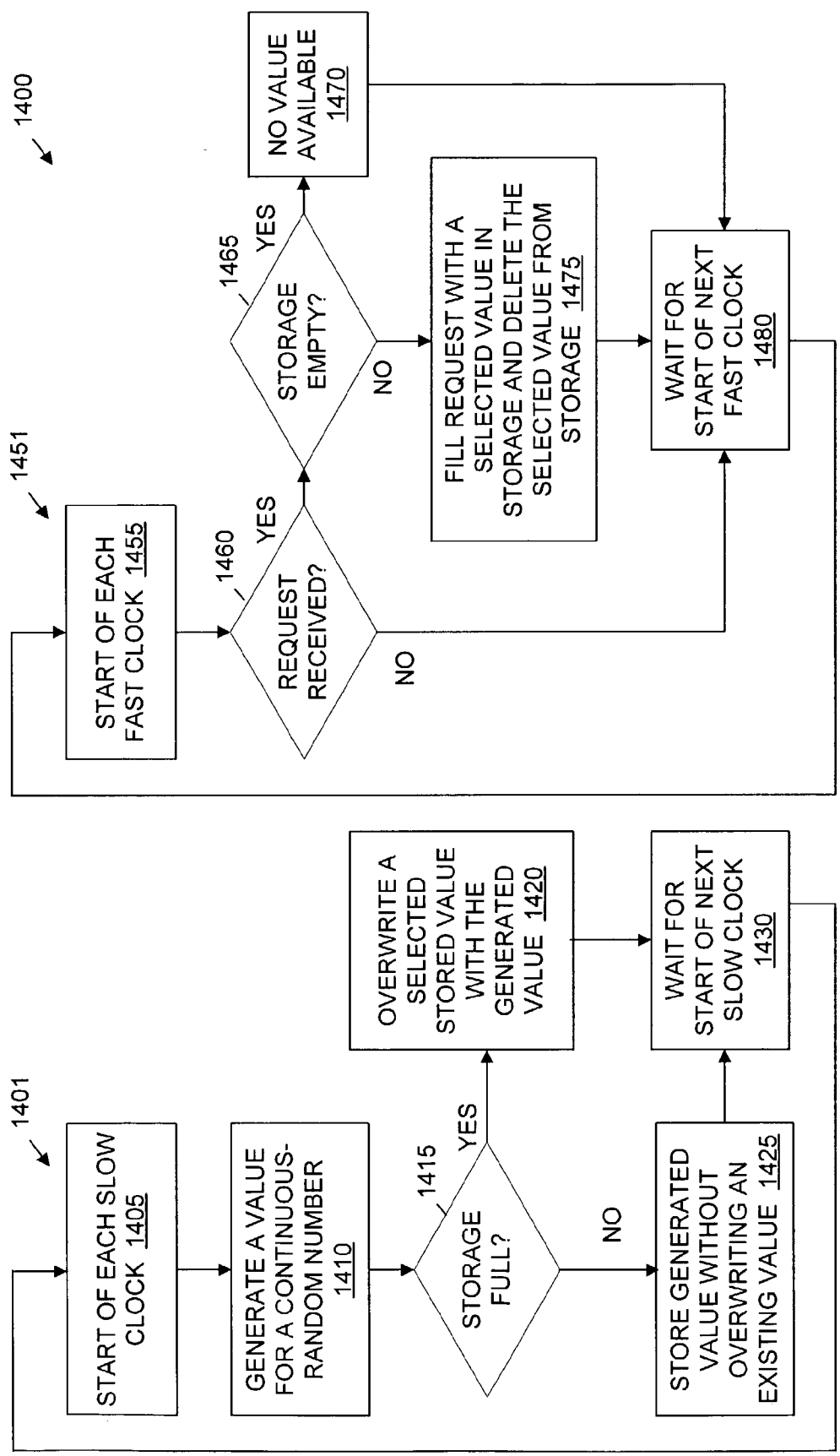
FIG. 14 shows flowcharts of an embodiment of a method for generating continuous random numbers on a slow clock and providing the continuous random numbers on a fast clock, in accordance with one aspect of the present invention.

Turning to FIG. 14, flowcharts 1401 and 1451 of a method 1400 for generating continuous random numbers on a slow clock and providing the continuous random numbers on a fast clock, in accordance with one aspect of the present invention, are shown. The flowchart 1401 of the method 1400 may be said to operate according to or cause to be created a "slow clock." The flowchart 1451 of the method 1400 may be said to operate according to or cause to be created a "fast clock." The fast clock of flowchart 1451 has a higher or equal frequency than the slow clock of flowchart 1401.

The flowchart 1401 of the method 1400 includes a start of each slow clock, in block 1405. The method 1400 generates a value for a continuous random number, in block 1410. The method 1400 checks if the storage is filled, in decision block 1415. If the storage is filled, in decision block 1415, the method 1400 overwrites a selected stored value in the storage with the newly generated value, in block 1420, and continues with block 1430. If the storage is not filled, in decision block 1415, the method 1400 stores the newly generated value in the storage without overwriting an existing value, in block 1425, and continues with block 1430. The method 1400 waits for a start of a next slow clock, in block 1430, and continues with block 1405.

The flowchart 1451 of the method 1400 includes a start of each fast clock, in block 1455. The method 1400 checks if a request for a value of a continuous random number has been received, in decision block 1460. If the request for a value of a continuous random number has been received, in decision block 1460, the method 1400 moves to decision block 1465. If the request for a value of a continuous random number has not been received, in decision block 1460, the method 1400 waits for the start of the next fast clock, in block 1480. Block 1480 is followed by block 1455.

The method 1400 checks if the storage is empty, in decision block 1465. If the storage is empty, in decision block 1465, then the method 1400 determines that no value is available, in block 1470, and moves to block 1480. If the storage is not empty, in decision block 1465, then the method 1400 fills the request for the value of the continuous random number with a selected value in storage and deletes the selected value from the storage, in block 1475, and moves to block 1480.

Turning to FIG. 15, flowcharts 1501 and 1551 of a method 1500 for generating a many-bit continuous random number on a slow clock and providing a subset of the bits of the continuous random number on a fast clock, in accordance with one aspect of the present invention, are shown. The flowchart 1501 of the method 1500 may be said to operate according to or cause to be created a "slow clock." The flowchart 1551 of the method 1500 may be said to operate according to or cause to be created a "fast clock." The fast clock of flowchart 1551 has a higher or equal frequency than the slow clock of flowchart 1501.

The flowchart 1501 of the method 1500 includes a start of each slow clock, in block 1505. The method 1500 generates a value for a continuous random number including N*K bits (i.e., N times K), in block 1510. The method 1500 stores the newly generated value with N*K bits, in block 1515. The method 1500 waits for a start of a next slow clock, in block 1520, and continues with block 1505.

The flowchart 1551 of the method 1500 includes a start of each fast clock, in block 1555. The method 1500 checks if a request for a value of a continuous random number has been received, in decision block 1560. If the request for a value of a continuous random number has been received, in decision block 1560, the method 1500 fills the request with selected K bits from storage, in block 1565, and moves to block 1570. If the request for a value of a continuous random number has not been received, in decision block 1560, then the method 1500 shifts the storage by K bits, discarding the selected K bits, in block 1570. The method 1500 waits for a start of a next fast clock, in block 1575, and continues with block 1555.

Figure 16:
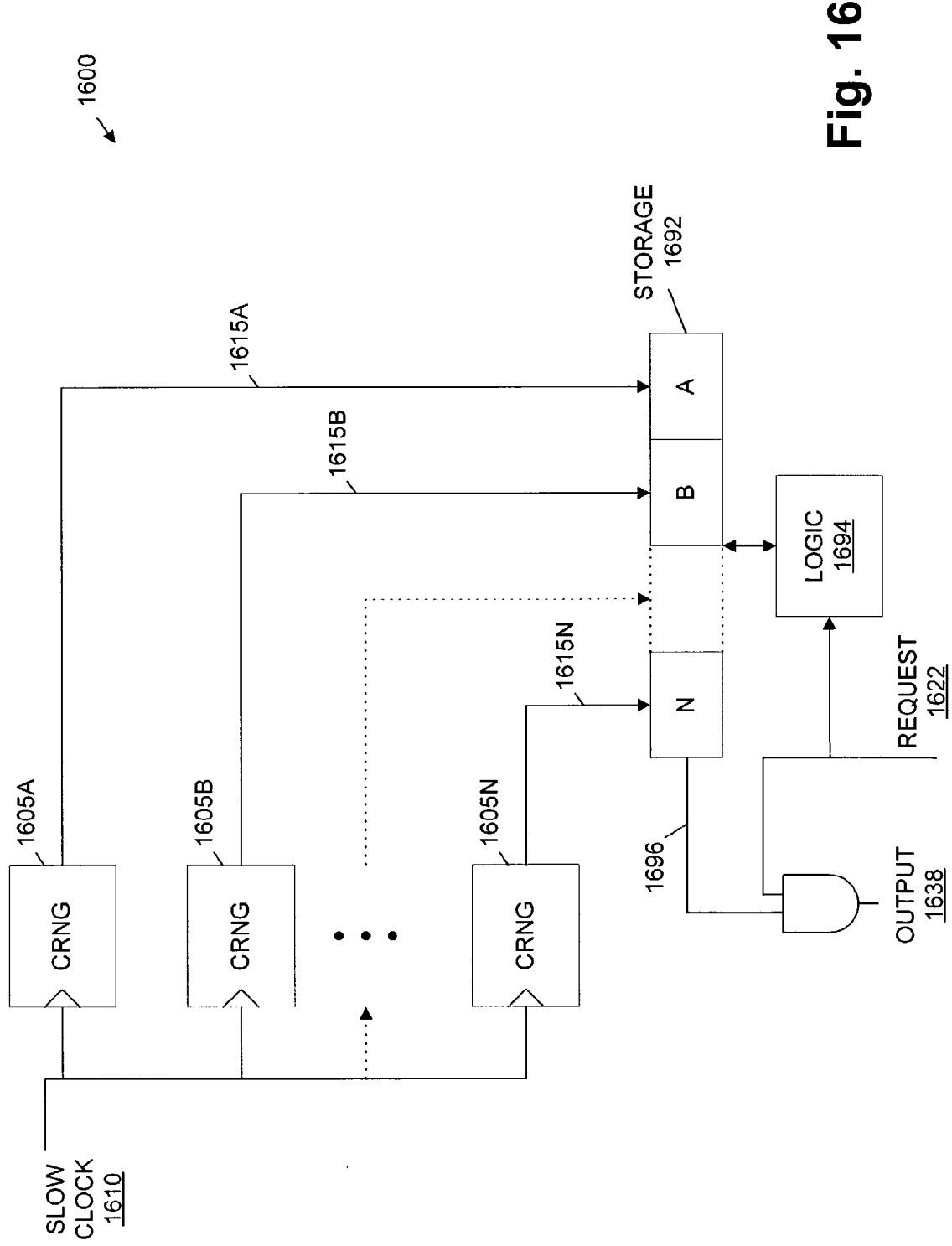
FIG. 16 shows a block diagram of an embodiment of an apparatus with a plurality of CRNGs, storage, and logic, in accordance with one aspect of the present invention.

Turning now to FIG. 16, a block diagram of an embodiment of an apparatus 1600 with a plurality of CRNGs 1605A–1605N, storage 1692, and logic 1694, in accordance with one aspect of the present invention, is shown. A "slow clock" 1610 is provided to each of the plurality of CRNGs 1605A–1605N as a request for a new iteration signal. Each CRNG 1605 outputs a respective value 1615 for a continuous random number, which is stored in a respective location in the storage 1692. The logic 1694 receives a request for a new value 1622 and is coupled to control the storage 1692. When the request for a new value 1622 is received at an AND gate 1636 as well as the logic 1694, a stored value 1696 is provided by to the AND gate from the storage 1692 as directed by the logic 1694. The AND gate 1636 provides the stored value 1696 as an output value 1638.

Turning to FIG. 17, flowcharts 1701 and 1751 of a method 1700 for generating multiple continuous random numbers on a slow clock and providing the continuous random numbers on a fast clock, in accordance with one aspect of the present invention, are shown. The flowchart 1701 of the method 1700 may be said to operate according to or cause to be created a "slow clock." The flowchart 1751 of the method 1700 may be said to operate according to or cause to be created a "fast clock." The fast clock of flowchart 1751 has a higher or equal frequency than the slow clock of flowchart 1701.

The flowchart 1701 of the method 1700 includes a start of each slow clock, in block 1705. The method 1700 generates K bit values for N continuous random numbers, in block 1710. The method 1700 stores the N newly generated values, in block 1715. The method 1700 waits for a start of a next slow clock, in block 1720, and continues with block 1705.

The flowchart 1751 of the method 1700 includes a start of each fast clock, in block 1755. The method 1700 checks if a request for a value of a continuous random number has been received, in decision block 1760. If the request for a value of a continuous random number has been received, in decision block 1760, the method 1700 fills the request from a selected storage location identified by a pointer, in block 1765, and moves to block 1770. If the request for a value of a continuous random number has not been received, in decision block 1760, then the method 1700 shifts the pointer to the next storage location, in block 1770. The method 1700 waits for a start of a next fast clock, in block 1775, and continues with block 1755. Note that the next storage location may be chosen by any method. In various embodiments, the next storage location may be chosen sequentially, by random, FIFO, or LIFO. The pointer may reset to an initial position with each next slow clock. The pointer may also only shift as indicated in the method 1700.

Figure 18:
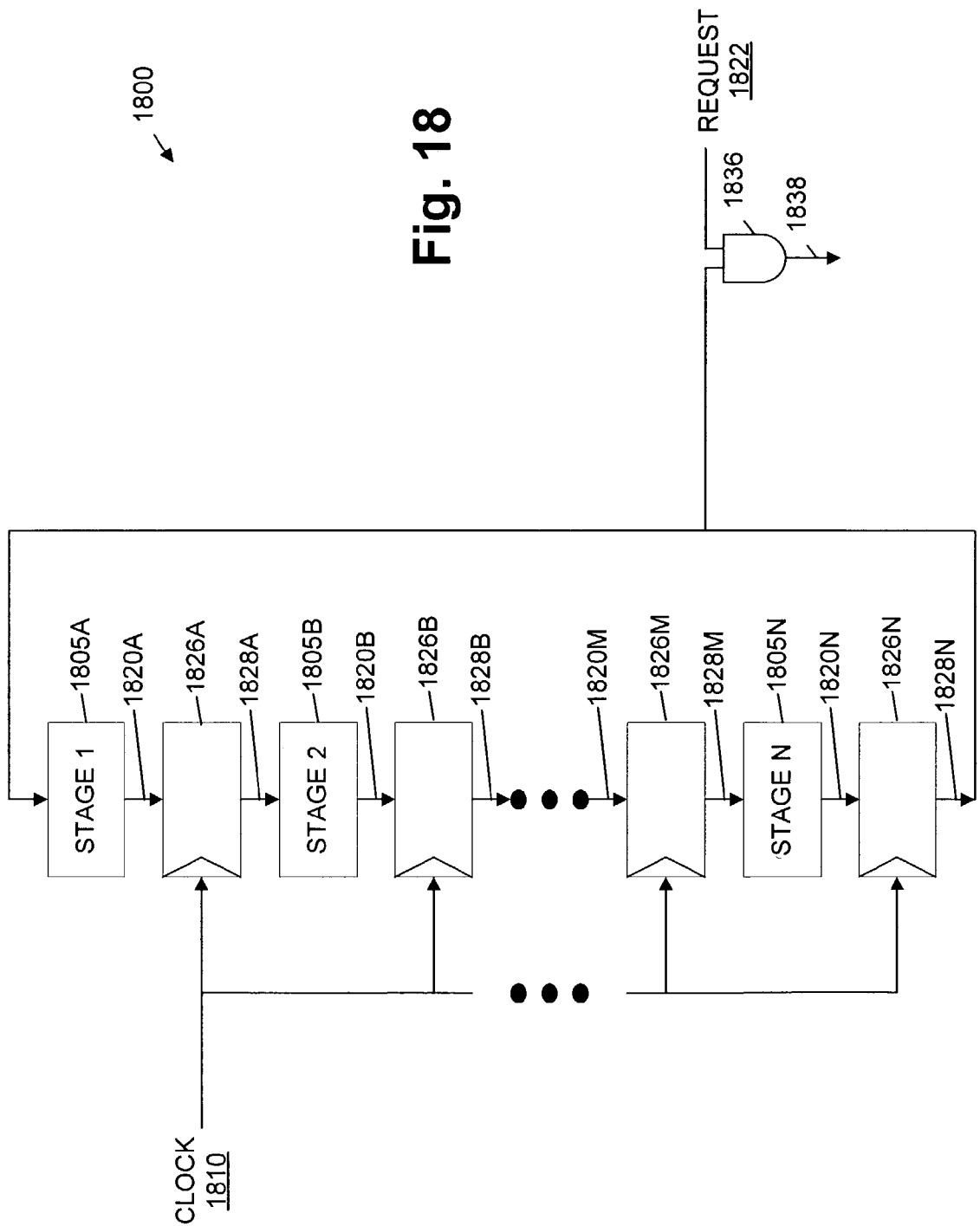
FIG. 18 shows a block diagram of an embodiment of a pipelined apparatus for generating continuous random numbers, in accordance with one aspect of the present invention.

Turning to FIG. 18, a block diagram of an embodiment of a pipelined apparatus 1800 for generating continuous random numbers, in accordance with one aspect of the present invention, is shown. A plurality of stages 1805A–1805N of a continuous random number function are shown, with each stage 1805A–1805N followed by a respective register 1826A–1826N. A respective stage value 1820A–1820N from the plurality of stages 1805A–1805N is provided to the respective register 1826A–1826N. A stored register value 1828A–1828N is provided to a next stage 1805B–1805A in wraparound fashion. FIG. 18 shows stages 1805A, 1805B, and 1805N; registers 1826A, 1826B, 1826M, and 1826N; stage values 1820A, 1820B, 1820M, and 1820N; and stored values 1828A, 1828B, 1828M, and 1828N. Each register 1826A–1826N is latched on a clock 1810.

The stored value 1828N, being the final output of the pipeline and a value of a continuous random number, is provided to an AND gate 1836. A request for the value of a continuous random number may also be received by the AND gate 1836. The AND gate 1836 provides an output value 1838.

The term pipelined is used as is well known in the electronic arts. The plurality of stages 1805A–1805N of the continuous random number function are portions of the continuous random number function partitioned to be used in the pipelined fashion, with each stage completing during each clock. The clock 1810 may include the fast clock or a system clock.

Figure 19:
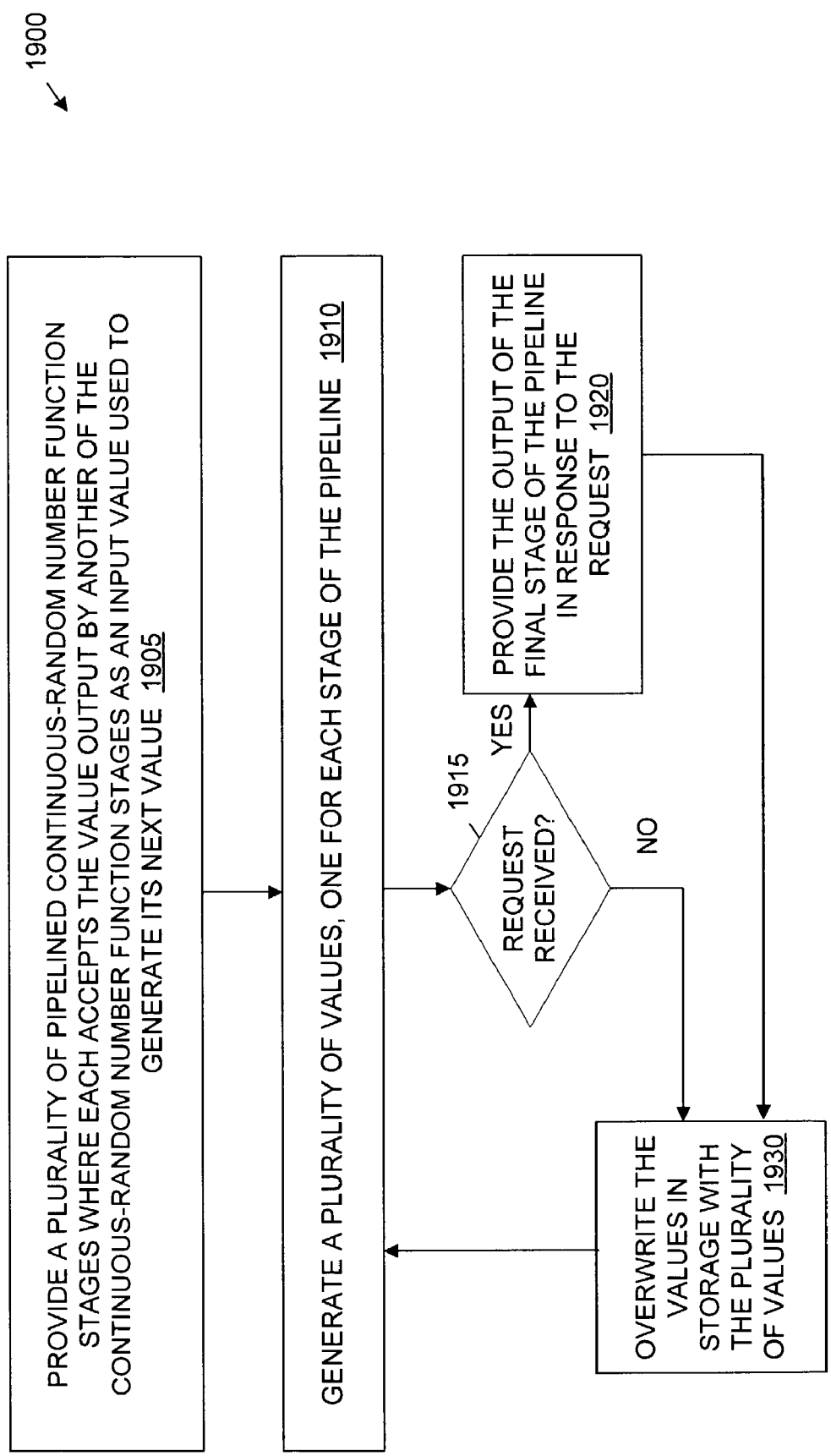
FIG. 19 show a flowchart of an embodiment of a method for generating, storing, and providing continuous random numbers using pipeline stages, in accordance with one aspect of the present invention.

Turning to FIG. 19, a flowchart of an embodiment of a method 1900 for generating, storing, and providing continuous random numbers using a pipelined continuous random number function, in accordance with one aspect of the present invention, is shown. The method 1900 includes providing the pipelined continuous random number function with a plurality of pipeline stage, wherein each stage accepts a value output by another stage of the pipeline as an input value to generate its next value, in block 1905. The method 1900 next generates a plurality of values, one for each stage of the pipeline, in block 1910. The method 1900 next checks, in decision block 1915, if a request for a value of a continuous random number has been received. If the request for the value of the continuous random number has been received in decision block 1915, then the method 1900 provides the output of the final stage of the pipeline in response to the request, in block 1920, and continues with block 1930. If the request for the value of the continuous random number has not been received in decision block 1915, then the method 1900 overwrites the values in storage locations following each stage with the plurality of values newly generated, in block 1930, and continues with block 1910.

Figure 20:
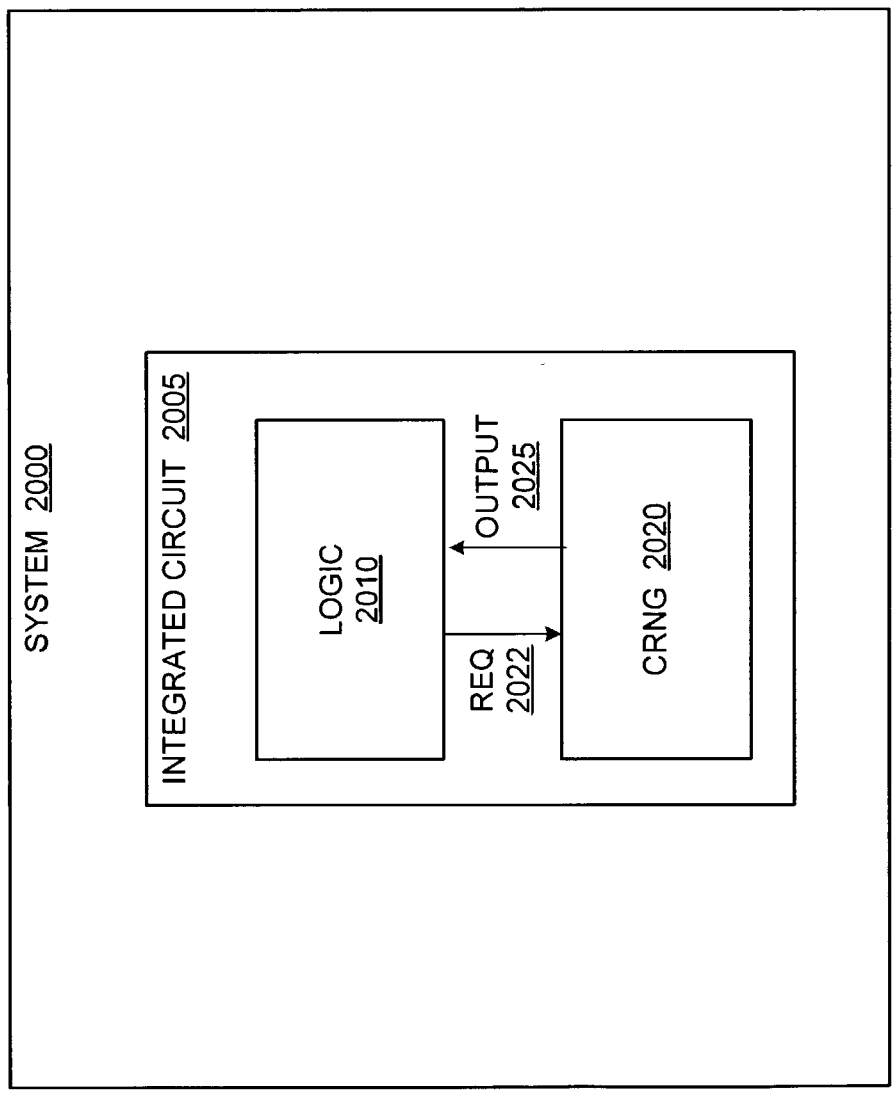
FIG. 20 shows a block diagram of an embodiment of a system including an integrated circuit with a CRNG, in accordance with one aspect of the present invention.

Turning to FIG. 20, a block diagram of an embodiment of a system 2000 including an integrated circuit 2005 with a CRNG 2020, in accordance with one aspect of the present invention, is shown. The integrated circuit 2005 also includes logic 2010 coupled to provide a request 2022 to the CRNG 2020 and coupled to receive an output value 2025 from the CRNG 2020.

The logic 2010 may include any type of logic, including a processor, a programmable logic, a co-processor, and/or a digital signal processor. When the logic 2010 is the processor, then the processor may generate an opcode that provides the request for the value 2025 from the CRNG 2020. The CRNG 2020 may be any embodiment of CRNG or HRNG, including those described herein.

Figure 21:
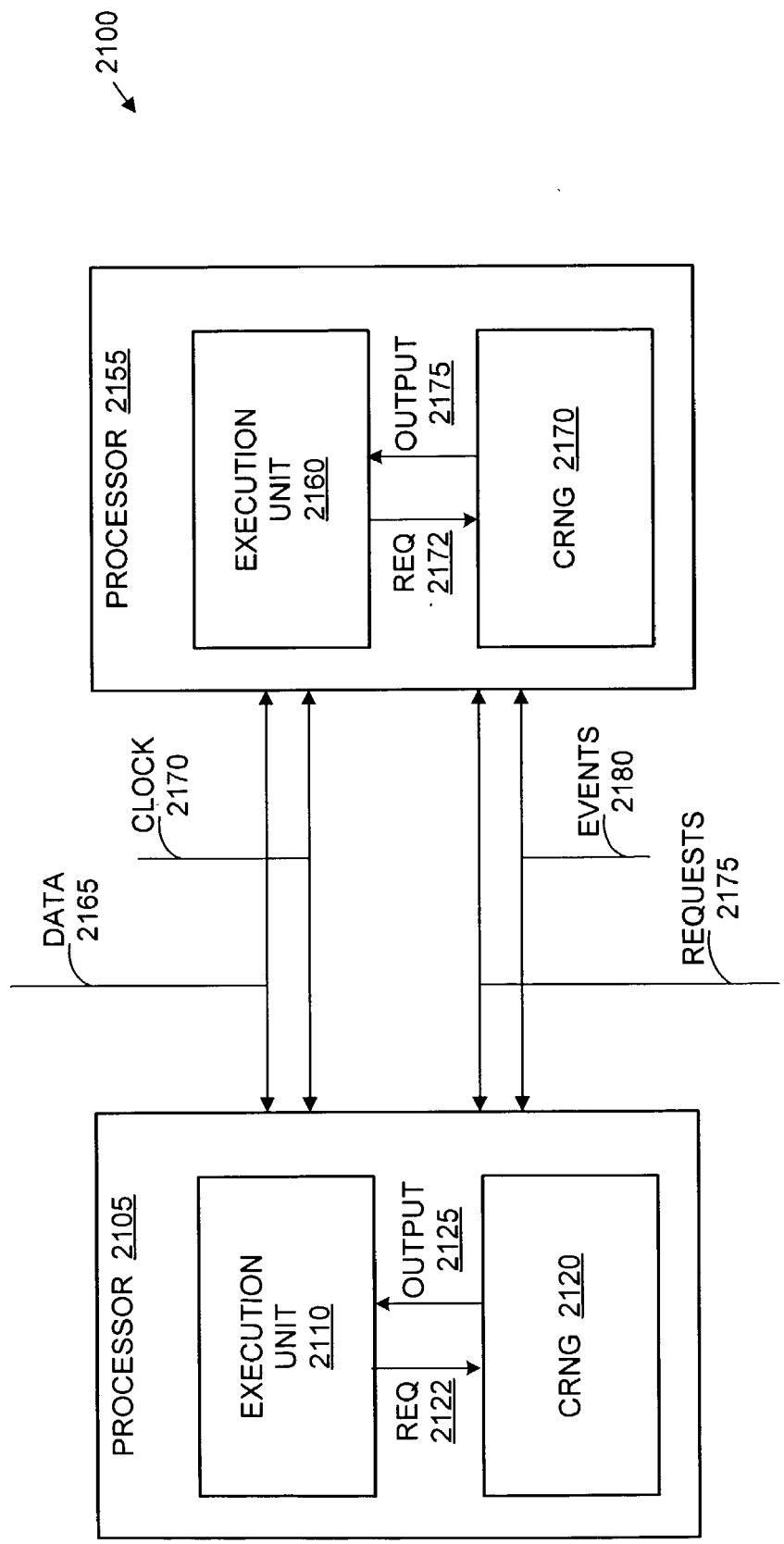
FIG. 21 shows a block diagram of an embodiment of two processors, each with a CRNG, operating in essentially identical operating environments, in accordance with one aspect of the present invention.

Turning to FIG. 21, a block diagram of an embodiment of a system 2100 including two substantially identical processors 2105 and 2155, each with a respective CRNG 2120 and 2170, operating in substantially identical operating environments, in accordance with one aspect of the present invention, is shown. The processor 2105 also includes an execution unit 2110 coupled to provide a request 2122 to the CRNG 2120 and coupled to receive an output value 2125 from the CRNG 2120. The processor 2155 also includes an execution unit 2160 coupled to provide a request 2172 to the CRNG 2170 and coupled to receive an output value 2175 from the CRNG 2170. Both processor 2105 and processor 2155 are coupled to receive identical data streams 2165, identical clock signals 2170, identical requests 2175, and identical events 2180.

Substantially identical operating environments include identical data streams 2165, identical clock signals 2170, identical requests 2175, and identical events 2180 such that the same bit values are produced on the same clocks for any bits that have an effect on an output. The CRNG 2170 may be any embodiment of CRNG or HRNG, including those described herein.

The processors 2105 and 2155 may be made to operate in a secure fail-over environment. The first processor 2105 may operate in a secure mode providing desired output. The second processor 2155 may also operate in the secure mode, duplicating the operations of the first processor 2105. When there is an error determined in the output of the first processor 2105, the second processor 2155 may be queried for its output, either as a check on the output of the first processor 2105, or as a replacement for the first processor 2105. A method 2250 of the latter is described here with respect to FIG. 22. Note that this method of operation does not work if a TRNG is used instead of a CRNG since two TRNGs would produce results different from each other whereas two CRNGs 2120 and 2170 will produce the same results because they react the same to the same environment (events 2180, requests 2175, etc.).

Figure 22:
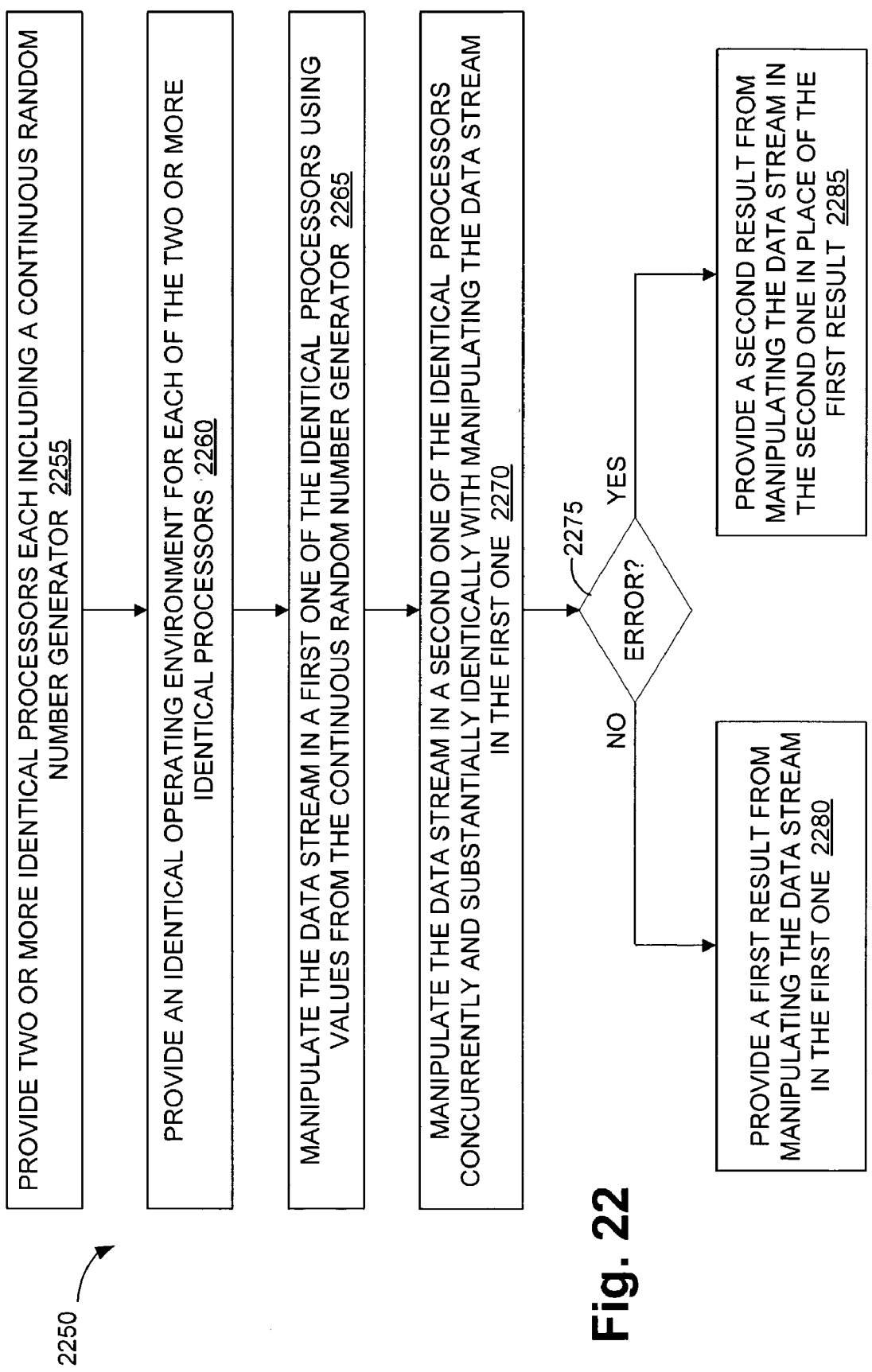
FIG. 22 shows a flowchart of an embodiment of an embodiment of a method of operating two processor, each with a CRNG, operating in essentially identical operating environments in a fail over mode, in accordance with one aspect of the present invention.

Turning to FIG. 22, a flowchart of an embodiment of the method 2250 of operating two processors, such as processors 2105 and 2155, each with a CRNG, such as CRNGs 2120 and 2170, operating in identical operating environments in a fail-over mode, in accordance with one aspect of the present invention, is shown. The method 2250 provides two or more identical processors each including a CRNG, in block 2255. The method 2250 provides identical data streams, identical clock signals, identical requests, and identical events to each of the two or more substantially identical processors, in block 2260.

The method 2250 manipulates the data stream in a first processor of the two or more identical processors using continuous random number values from the CRNG, in block 2265. The method 2250 manipulates the data stream in a second processor of the two or more identical processors using continuous random number values from the CRNG, in block 2270. The method 2250 performs error checking in decision block 2275. If there is no error found, in decision block 2275, then the method 2250 continues with block 2280. If an error is found, in decision block 2275, then the method 2250 continues with block 2285.

The method 2250 provides a first result from manipulating the data stream in the first processor, in block 2280. The method may continue after block 2280 with block 2260. If an error is found, in decision block 2275, then the method 2250 continues with block 2285. The method 2250 in block 2285 provides a second result from manipulating the data stream in the second processor. The method may continue after block 2280 with block 2260, with the second processor becoming the first processor. The original first processor may be replaced with a new second processor.

The method 2250 is an example of operation of a secure fail-over system. In another embodiment, providing the output of the first processor may occur prior to checking for errors, and then substituting the output of the second processor if the first processor is found to be causing errors. Other fail-over methods using secure operations involving the CRNG may be implemented by those of skill in the art having the benefit of this disclosure.

Figure 23:
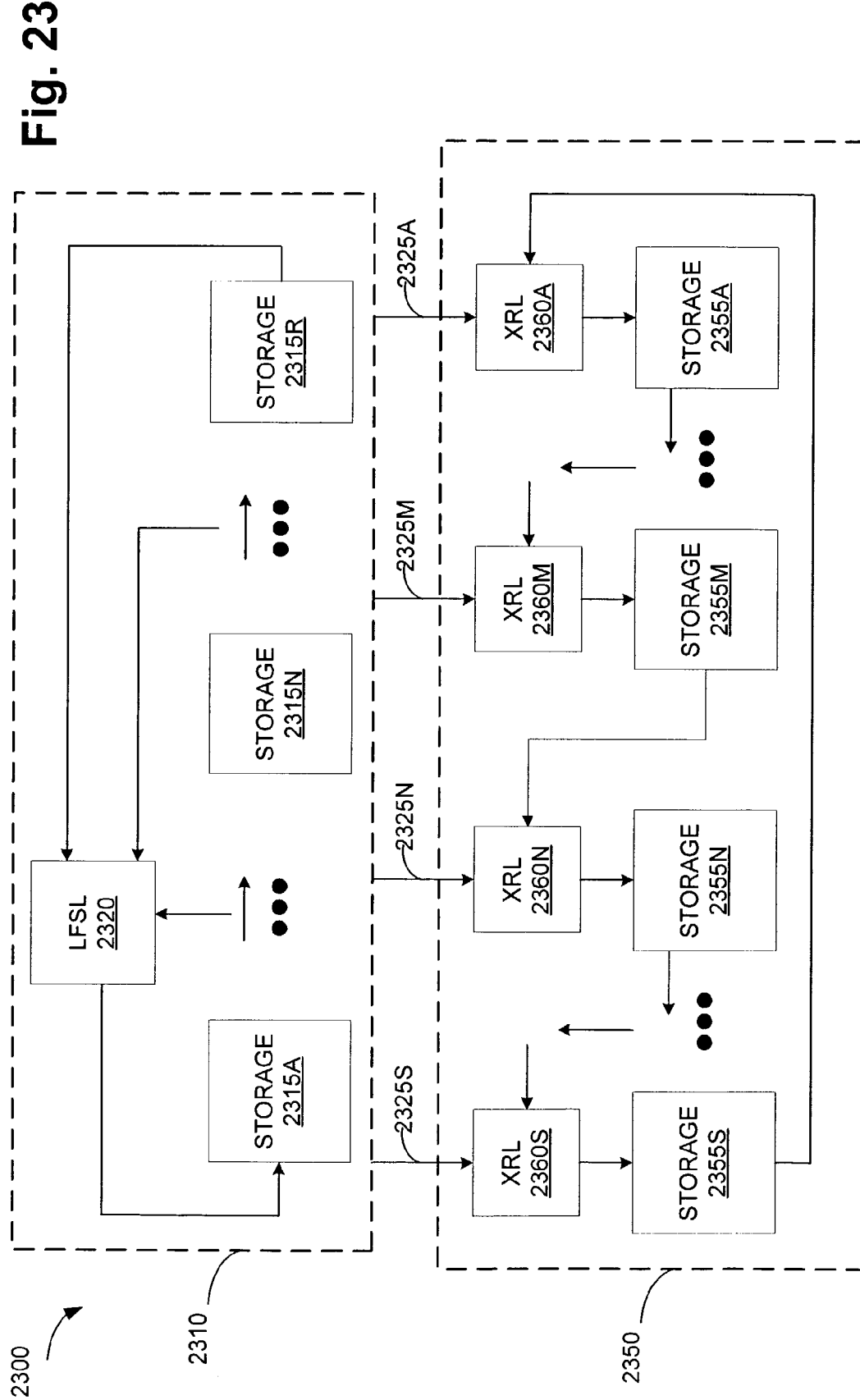
FIG. 23 shows a block diagram of an embodiment of an XOR random number generator usable in a CRNG, in accordance with one aspect of the present invention.

Turning to FIG. 23, a block diagram of an embodiment of an XOR random number generator 2300 usable as a continuous random number function 140, etc., in a CRNG 100, etc., in accordance with one aspect of the present invention, is shown. The XOR random number generator 2300 is only briefly described herein, and additional details and embodiments may be found in co-pending U.S. patent application Ser. No. 10/138,720, filed May 3, 2002, entitled "Method And Apparatus For Generating Pseudo-Random Numbers," whose inventor is Leonard D. Rarick, which is incorporated by reference herein in its entirety. In general terms, the XOR random number generator 2300 is a small, fast random number generator that can generate a large number of bits at each iteration. The XOR random number generator 2300 is suitable for implementation in either hardware or software but is fast enough for useful implementation in hardware.

The XOR random number generator 2300 includes a linear feedback shift register 2310 and an XOR register 2350. The linear feedback shift register 2310 provides values 2325A, . . . , 2325M, 2325N, . . . , 2325S to the XOR register 2350. The linear feedback shift register 2310 includes a plurality of storage locations (storage) 2315A, . . . , 2315N, . . . , 2315R, labeled from left to right, and linear feedback shift logic (LFSL) 2320.

The data stored in the plurality of storage locations 2315A, . . . , 2315N, . . . , 2315R are updated in each iteration generally according to a counter-clockwise flow with various values provided to the linear feedback shift logic 2320. The datum stored in the storage location 2315A is typically used to update the datum stored in the storage location 2315B (not shown), and so on through the storage location 2315R, moving from left to right. The linear feedback shift logic 2320, as shown, receives the datum from the storage location 2315R and from one or more additional storage locations 2315 and provides an updated value during each iteration to the storage location 2315A.

As shown in FIG. 23, the XOR register 2350 includes a plurality of XOR register logic circuits (XRL) 2360A, . . . , 2360M, 2360N, . . . , 2360S, labeled from right to left, and a plurality of storage locations (storage) 2355A, . . . , 2355M, 2355N, . . . , 2355S, labeled from right to left. Each of the XOR register logic circuits 2360A, . . . , 2360M, 2360N, . . . , 2360S may receive one or more of the values from one or more of the plurality of storage locations 2355A, . . . , 2355M, 2355N, . . . , 2355S and/or one or more of the values 2325A, . . . , 2325M, 2325N, . . . , 2325S from the linear feedback shift register 2310. The data stored in the plurality of storage locations 2355A, . . . , 2355M, 2355N, . . . , 2355S are generally updated each iteration according to a counter-clockwise flow, with the datum stored in the storage location 2355A typically used to update the datum stored in storage location 2355B (not shown), and so on through the storage location 2355S, moving from right to left. The datum stored in the storage location 2355S is typically used to update the datum in the storage location 2355A.

The linear feedback shift register 2310 stores R bits and through the linear feedback shift logic 2320 uses a polynomial over the integers, mod 2. The linear feedback shift register 2310 by itself is known in the art. The linear feedback shift register 2310 is a conventional device, typically designed into each device as needed. The properties of the linear feedback shift register 2310 have been well analyzed, and, by itself, the linear feedback shift register 2310 is not suitable for cryptographic use. When the linear feedback shift register 2310 storing the R bits uses a primitive polynomial, the linear feedback shift register 2310 will cycle through all possible non-zero values and return to an initial non-zero value in $2^R-1$ iterations.

The XOR register 2350 stores S bits, which provide an output value of the random number for the XOR random number generator 2300. The number of G bits to be produced by the XOR random number generator 2300 as the random number 2395 will be less than or equal to S, i.e., G<=S. In one embodiment, the XOR register logic circuits 2360A, ..., 2360M, 2360N, ..., 2360S implement an XOR register function defined on the integers corresponding to the S bits with a range of the set {XOR, XNOR, FIRST OPERAND}. The FIRST OPERAND is a type of identity function defined as FO(a,b, ...)=a. In other embodiments, the set may include additional or fewer logic functions, as desired. In one embodiment, the function that defines the values 2325A, ..., 2325M, 2325N, ..., 2325S from the linear feedback shift register 2310 is a correspondence function defined on the integers corresponding to the S bits with a range of the integers corresponding the R bits.

According to one embodiment of the XOR random number generator 2300, for each iteration of the XOR random number generator 2300, the data stored in the plurality of storage locations 2355A, ..., 2355M, 2355N, ..., 2355S are updated as follows. The storage location 2355A receives the datum delivered from the XOR register function 2360A which operated on the datum stored in the Storage location 2355(S) and the datum produced by the correspondence function to produce the value 2325A. The storage location 2355B (not shown) receives the datum delivered from the XOR register function 2360B which operated on the datum stored in the Storage location 2355A and the datum, produced by the correspondence function to produce value 2325B (not shown). The storage location 2355C (not shown) receives the datum produced by the XOR register function 2360C which operated on the datum stored in the storage location 2355B (not shown) and the datum produced by the correspondence function to produce the value 2325C. The storage location 2355S receives the datum produced by the XOR register function 2360S operating on the datum stored in the storage location 2355(S1) and the datum produced by the correspondence function which produced the value 2325S, etc.

The XOR random number generator 2300 uses the following selections during operation:

G=number of bits in the output random number;
S=number of bits stored in the XOR register 2350, G<=S;
The initial values for the S bits stored in the XOR register 2350;
R=number of bits stored in the linear feedback shift register 2310;
The polynomial used to define the linear feedback shift register 2310;
The initial values for the R bits stored in the linear feedback shift register 2310;
The correspondence function that determines how the R bits map to the S XOR register logic circuits 2360;
The XOR register function defined over the S XOR register logic circuits 2360; and
The G bits of the S bits that will be provided as the value 2395 of the random number.

A long cycle length, i.e., the number of iterations before the XOR random number generator 2300 repeats, is desirable. If a primitive polynomial is chosen for the linear feedback shift register 2310 and S is a prime number and not a divisor of $2^R-1$, then the cycle length will be a multiple of $2^R-1$. The cycle length may be dependent on the initial values in the plurality of storage locations 2355A, ..., 2355M, 2355N, ..., 2355S and the XOR register logic 2360. When the XOR register logic 2360 includes an odd number of XNORs, there is one case where the cycle length is $2(2^R-1)$, and the rest of the cycle lengths are $2S(2^R-1)$. The only requirement for the initial value for the plurality of storage locations 2315A, ..., 2315N, ..., 2315R is that it be non-zero. Note that the operation the XOR random number generator 2300 may be referred to as an XOR random number function.

Note that while the methods 200, 400, 600, 800, 1200, 1400, 1500, 1700, 1900, and 2200 of the present invention disclosed herein have been illustrated as flowcharts, various elements of the flowcharts may be omitted or performed in a different order in various embodiments. Note also that the methods 200, 400, 600, 800, 1200, 1400, 1500, 1700, 1900, and 2200 of the present invention disclosed herein admit to variations in implementation. Note also that to the extent possible, the CRNGs 100, 300, 500, 700, 900, 1000, and 1100 have corresponding reference numerals in the format XAB, where X is the figure number and AB are the last two digits in the reference number. In various embodiments, reference numbers with identical AB values correspond to identical referenced items. In other embodiments, reference numbers with identical AB values do not correspond to identical referenced items. A similar number sequence is used for methods 200, 400, 600, 800, and 1200, with similar identical and non-identical representations, depending on the embodiment of the particular method 200, 400, 600, 800, 1200.

Some aspects of the present invention, as disclosed above, may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method that provides values for continuous random numbers, the method comprising:
   receiving at least an input signal different from a request for a value;
   generating a value for a continuous random number using a continuous random number function with a plurality of iterations responsive to at least the input signal different from a request for the value;
   providing the value if the request for the value is received;
   receiving the value and an initial state;
   receiving a selector signal that selects between the value and the initial state as an output value; and
   providing the output value to the storage location.

2. The method of claim 1, wherein generating the value for the continuous random number using the continuous random number function with the plurality of iterations responsive to at least the input signal different from the request for the value comprises generating the value for the continuous random number using the continuous random number function with iterations periodically responsive to at least the input signal different from the request for the value.

3. The method of claim 2, wherein generating the value for the continuous random number using the continuous random number function with iterations periodically responsive to at least the input signal different from the request for the value comprises generating the value for the continuous random number using the continuous random number function responsive to a clock signal.

4. The method of claim 2, wherein generating the value for the continuous random number using the continuous random number function with iterations periodically responsive to at least the input signal different from the request for the value comprises generating the value for the continuous random number using the continuous random number function with each iteration responsive to at least the input signal different from the request for the value.

5. The method of claim 1, further comprising: generating a new value responsive to at least another input signal different from the request for the value, wherein generating the new value is independent of providing the value in response to the request.

6. The method of claim 1, further comprising: modifying the value using an external source of entropy prior to generating the new value for the continuous random number.

7. The method of claim 1, further comprising: initializing the value with a starting value prior to generating the value.

8. The method of claim 7, wherein initializing the value with a starting value comprises initializing the value with the starting value using an external source.

9. The method of claim 1, wherein generating the value for the continuous random number using the continuous random number function with the plurality of iterations responsive to at least the input signal different from the request for the value comprises generating the value for the continuous random number using an XOR pseudo-random number function.

10. The method of claim 1, wherein generating the value for the continuous random number using the continuous random number function with the plurality of iterations responsive to at least the input signal different from the request for the value further comprises generating the value for the continuous random number using an additional continuous random number function responsive to one or more signals different from the input signal.

11. The method of claim 10, wherein generating the value for the continuous random number using the additional continuous random number function responsive to the one or more signals different from the input signal comprises generating the value for the continuous random number using the additional continuous random number function responsive to at least an event occurrence.

12. The method of claim 10, wherein generating the value for the continuous random number using the continuous random number function with the plurality of iterations responsive to at least the input signal different from the request for the value comprises further comprises generating the value for the continuous random number using an additional continuous random number function responsive to a plurality of signals different from the input signal.

13. The method of claim 1, wherein generating the value for the continuous random number using the continuous random number function with the plurality of iterations responsive to at least the input signal different from the request for the value comprises generating the value for the continuous random number using the continuous random number function with the plurality of iterations responsive to at least one of a group of signals in addition to the request for the value, the group of signals consisting of an interrupt signal, a trap signal, a cache miss signal, the request for the new value, and an output of a true random number generator.

14. The method of claim 1, wherein generating the value for the continuous random number using the continuous random number function with the plurality of iterations responsive to at least the input signal different from the request for the value further comprises generating the value for the continuous random number using at least one of a plurality of additional continuous random number functions responsive to one or more signals different from the input signal.

15. The method of claim 14, wherein generating the value for the continuous random number using at least one of the plurality of additional continuous random number functions responsive to one or more signals different from the input signal comprises generating the value for the continuous random number responsive to one or more of a group of signals in addition to the request for the value, the group of signals consisting of an interrupt signal, a trap signal, a cache miss signal, the request for the new value, and an output of a true random number generator.

16. The method of claim 1, wherein generating the value for the continuous random number using the continuous random number function with the plurality of iterations responsive to at least the input signal different from the request for the value further comprises generating the value for the continuous random number using an additional continuous random number function responsive to one or more signals different from the input signal as well as the input signal.

17. The method of claim 1, wherein providing the value if the request for the value is received comprises providing the value only if the request for the value is received.

18. An apparatus that generates values for continuous random numbers, the apparatus comprising:
   a continuous random number function configured to receive a first value and to generate a value for a continuous random number;
   a storage location configured to store the value for the continuous random number in response to at least an input signal different from a request for the value; and
   a circuit coupled to receive the value and an initial state, wherein the circuit is configured to receive a selector signal that selects between the value and the initial state as an output value for the circuit, wherein the output value for the circuit is provided to the storage location.

19. The apparatus of claim 18, further comprising: an output gate coupled to receive the request for the value and to provide the value as an output signal in response to receiving the request.

20. The apparatus of claim 19, further comprising: an output function coupled between the storage location and the output gate, wherein the output function is configured to transform the value.

21. The apparatus of claim 18, wherein the continuous random number function comprises an XOR pseudo-random number function.

22. The apparatus of claim 21, wherein the continuous random number function includes a plurality of XOR pseudo-random number functions.

23. The apparatus of claim 18, further comprising:
   a first circuit coupled to receive the value and an initial state, wherein the first circuit is configured to receive a first selector signal that selects between the value and the initial state as an output value for the first circuit, wherein the output value for the first circuit is provided to a combination function; the combination function configured to receive the output value of the first circuit and an entropy value; and
   a second circuit coupled to receive the output value for the first circuit and a resultant value from the combination function, wherein the second circuit is configured to select an output value for the second circuit based on a second selector signal, wherein the output value for the second circuit is provided to the storage location.

24. The apparatus of claim 18, further comprising:
   a circuit coupled to receive the value from the continuous random number function; and
   a Heisenberg function coupled to receive the value and coupled to provide a Heisenberg value to the circuit coupled to receive the value, wherein the circuit coupled to receive the value is further coupled to receive the request and to provide the Heisenberg value in response to the request, wherein the circuit coupled to receive the value is configured to provide the value if the request is not received.

25. The apparatus of claim 24, wherein the circuit coupled to receive the value is further configured to output the Heisenberg value in response to an external event.

26. The apparatus of claim 18, further comprising:
   a circuit coupled to receive the value from the continuous random number function;
   a plurality of event functions each coupled to receive the value and each coupled to provide a respective value to the circuit coupled to receive the value from the continuous random number function; and
   a Heisenberg-event function coupled to receive the value and coupled to provide a Heisenberg-event value to the circuit coupled to receive the value, wherein the circuit coupled to receive the value is further coupled to receive the request and to receive a notice of an event, wherein the multiplexer is configured to provide the Heisenberg value in response to only the request, to provide the event value in response to only the notice of the event, to provide the Heisenberg-event value in response to receiving both the request and the notice of the event, and otherwise to provide the value from the continuous random number function.

27. The apparatus of claim 18, wherein the storage location is responsive to at least one of a group of signals consisting of an interrupt signal, a trap signal, a cache miss signal, the request for the new value, and an output of a true random number generator.

28. A method that provides values for continuous random numbers, the method comprising:
   generating a value for a continuous random number;
   receiving the value and an initial state;
   generating a new value for the continuous random number independent of a request for the value of the continuous random number;
   providing the new value for the continuous random number in response to the request for the value of the continuous random number;
   receiving a selector signal that selects between the value and the initial state as an output value; and
   providing the output value to a storage location.

29. The method of claim 28, further comprising: modifying the value for the continuous random number using an external source of entropy.

30. The method of claim 28, further comprising: initializing the value for the continuous random number to a starting value.

31. The method of claim 30, wherein initializing the value for the continuous random number to the starting value comprises initializing the value for the continuous random number to the starting value using an external source.

32. The method of claim 28, further comprising: generating the new value using a different function.

33. The method of claim 32, wherein generating the new value using the different function further comprises generating the new value either prior to, concurrently with, or after providing the new value for the continuous random number in response to the request for the value for the continuous random number.

34. The method of claim 32, wherein modifying the new value using the different function modifying the new value using the different function in response to the request.

35. The method of claim 32, wherein modifying the new value using the different source of values for continuous random numbers comprises modifying the new value using the different source of values for continuous random numbers in response to an occurrence of an external event.

36. The method of claim 28, wherein generating the value for the continuous random number comprises generating the value for the continuous random number responsive to a clock signal; and wherein generating the new value for the continuous random number independent of the request for the new value for the continuous random number comprises generating the new value of the continuous random number independent of the request for the value of the continuous random number and responsive to the clock signal.

37. The method of claim 28, wherein generating the value for the continuous random number comprises generating the value for the continuous random number using an XOR pseudo-random number function; and wherein generating the new value for the continuous random number independent of the request for the value of the continuous random number comprises generating the new value for the continuous random number using the XOR pseudo-random number function.

38. The method of claim 28, further comprising: providing a different function for generating the new value; and modifying the different function in response to an occurrence of an external event.

39. An apparatus that provides values for continuous random numbers, the apparatus comprising:
means for receiving at least an input signal different from a request for a value;
a continuous random number function with a plurality of iterations responsive to at least an input signal different from a request for the value;
means for providing the value if the request for the value is received;
a storage location configured to store the value for the continuous random number in response to at least an input signal different from a request for the value;
a circuit coupled to receive the value from the continuous random number function;
a plurality of event functions each coupled to receive the value and each coupled to provide a respective value to the circuit coupled to receive the value from the continuous random number function; and
a Heisenberg-event function coupled to receive the value and coupled to provide a Heisenberg-event value to the circuit coupled to receive the value, wherein the circuit coupled to receive the value is further coupled to receive the request and to receive a notice of an event, wherein the multiplexer is configured to provide the Heisenberg value in response to only the request, to provide the event value in response to only the notice of the event, to provide the Heisenberg-event value in response to receiving both the request and the notice of the event, and otherwise to provide the value from the continuous random number function.

40. The apparatus of claim 39, wherein the continuous random number function is periodically responsive to at least the input signal different from the request for the value.

41. The apparatus of claim 40, wherein the continuous random number function is responsive to a clock signal.

42. The apparatus of claim 39, wherein the continuous random number function is responsive each iteration to at least the input signal different from the request for the value.

43. An apparatus that provides values for continuous random numbers, the apparatus comprising:
means for generating a value for a continuous random number;
means for generating a new value for the continuous random number independent of a request for the value of the continuous random number;
means for providing the new value for the continuous random number in response to the request for the value of the continuous random number;
a storage location configured to store the value for the continuous random number in response to at least an input signal different from a request for the value;
a circuit coupled to receive the value and an initial state, wherein the circuit is configured to receive a selector signal that selects between the value and the initial state as an output value for the circuit, wherein the output value for the circuit is provided to the storage location.

44. The apparatus of claim 43, further comprising: means for modifying the value for the continuous random number using an external source.

45. An apparatus for generating values for continuous random numbers, the apparatus comprising:
a continuous random number function responsive to at least an input signal different from a request for the value for at least a plurality of iterations;
a register configured to store a value for a continuous random number from the continuous random number function in response to a first clock signal as values are output by the continuous random number function;
storage configured to store a plurality of values output from the register;
logic coupled to control the storage, wherein the logic is configured to fill the storage with the plurality of values output from the register and to overwrite a value in the storage when the storage is full;
an output gate coupled to receive a request for the continuous random number and to provide one of the plurality of values in the storage as an output signal in response to receiving the request for the continuous random number; and
a circuit coupled to receive the value and an initial state, wherein the circuit is configured to receive a selector signal that selects between the value and the initial state as an output value for the circuit, wherein the output value for the circuit is provided to the storage location.

46. The apparatus of claim 45, wherein a maximum rate for the requests is a multiple of the first clock, and wherein a number of values in the plurality of values is greater than or equal to the multiple.

47. The apparatus of claim 45, wherein the continuous random number function is one or more XOR pseudo-random number functions.

48. An apparatus for generating values for continuous random numbers, the apparatus comprising:
means for generating a series of values for the continuous random numbers responsive to at least an input signal different from a request for the value for at least a plurality of iterations;
means for storing each value of the series of values;
means for providing a first selected value from storage in response to the request if the storage is not empty;
means for overwriting a second selected value in storage with the current value if the storage is full; and
a circuit coupled to receive the value and an initial state, wherein the circuit is configured to receive a selector signal that selects between the value and the initial state as an output value for the circuit, wherein the output value for the circuit is provided to the storage location.

49. An apparatus for generating values for continuous random numbers, the apparatus comprising:
a plurality of storage locations configured to receive an input signal;
a plurality of continuous random number functions each configured to receive a first value from a first respective one of the plurality of storage locations, wherein each of the plurality of continuous random number functions is further configured to provide a second value to a second respective one of the plurality of storage locations, wherein the plurality of the pipelined continuous random number functions are pipelined to produce a next value from a previous value; and an output circuit configured to receive a value from one of the plurality of storage locations and a request signal, wherein the output circuit is further configured to provide a value for a continuous random number in response to the request signal; and a circuit coupled to receive the value and an initial state, wherein the circuit is configured to receive a selector signal that selects between the value and the initial state as an output value for the circuit, wherein the output value for the circuit is provided to the one of the plurality of storage locations.

50. The apparatus of claim 49, wherein the input signal is a clock signal.

51. An integrated circuit, comprising:

a continuous random number function configured to provide a value for a continuous random number;

a storage location configured to store the value for the continuous random number in response to at least an input signal different from a request for the value;

a first circuit coupled to receive the value and an initial state, wherein the first circuit is configured to receive a first selector signal that selects between the value and the initial state as an output value for the first circuit, wherein the output value for the first circuit is provided to a combination function; the combination function configured to receive the output value of the first circuit and an entropy value; and a second circuit coupled to receive the output value for the first circuit and a resultant value from the combination function, wherein the second circuit is configured to select an output value for the second circuit based on a second selector signal, wherein the output value for the second circuit is provided to the storage location.

52. The integrated circuit of claim 51, wherein the integrated circuit further includes logic coupled to receive the value for the continuous random number, wherein the logic is configured to request the value for the continuous random number from the continuous random number function.

53. The integrated circuit of claim 52, wherein the logic comprises an execution unit.

54. The integrated circuit of claim 52, wherein the execution unit is configured to execute an opcode that signals the continuous random number function of the request for the value for the continuous random number.

55. An apparatus comprising an integrated circuit including a continuous random number function configured to provide a value for a continuous random number; logic coupled to receive the value for the continuous random number; and a Heisenberg function coupled to receive the value and coupled to provide a Heisenberg value to the circuit coupled to receive the value, wherein the circuit coupled to receive the value is further coupled to receive the request and to provide the Heisenberg value in response to the request, wherein the circuit coupled to receive the value is configured to provide the value if the request is not received.

* * * * *